United States Patent
Leal Ribeiro

(10) Patent No.: US 11,614,016 B2
(45) Date of Patent: Mar. 28, 2023

(54) SYSTEM FOR CLEANING GASES AND SEQUESTRATION OF PARTICULATE MATERIAL FROM INTERNAL COMBUSTION ENGINES WITH CONVERSION OF WASTE INTO EXTRA ENERGY

(71) Applicants: RIBERMAN INOVAÇÕES TECNOLOGICAS LTDA.—ME, São Paulo (BR); Felipe Burman Nicolau, São Paulo (BR)

(72) Inventor: Gilberto Leal Ribeiro, São Paulo (BR)

(*) Notice: Subject to any disclaimer, the term of this patent is extended or adjusted under 35 U.S.C. 154(b) by 557 days.

(21) Appl. No.: 16/547,414

(22) Filed: Aug. 21, 2019

(65) Prior Publication Data

US 2020/0116065 A1    Apr. 16, 2020

Related U.S. Application Data

(63) Continuation-in-part of application No. PCT/BR2018/050028, filed on Feb. 9, 2018.

(30) Foreign Application Priority Data

Feb. 21, 2017    (BR) .......................... 102017003577 8

(51) Int. Cl.
*F01N 5/04*    (2006.01)
*B01D 45/08*    (2006.01)
(Continued)

(52) U.S. Cl.
CPC .............. *F01N 5/04* (2013.01); *B01D 45/00* (2013.01); *B01D 45/08* (2013.01); *B01D 45/14* (2013.01);
(Continued)

(58) Field of Classification Search
CPC ... F01N 5/04; F01N 3/037; F01N 3/04; F01N 3/0821; F01N 2240/22; F01N 2290/04;
(Continued)

(56) References Cited

U.S. PATENT DOCUMENTS

| 5,407,456 A | 4/1995 | Tseng .............................. 55/228 |
| 2011/0000191 A1 | 1/2011 | Scappatura ..................... 60/274 |

FOREIGN PATENT DOCUMENTS

| BR | PI0502332 | 12/2006 | ............... F01N 3/04 |
| GB | 2300024 | 11/1995 | ............... F01N 3/04 |

(Continued)

OTHER PUBLICATIONS

International Preliminary Report on Patentability (w/translation) issued in application No. PCT/BR2018/050028, dated May 18, 2019 (34 pgs).

(Continued)

*Primary Examiner* — Mickey H France
(74) *Attorney, Agent, or Firm* — Hayes Soloway P.C.

(57) ABSTRACT

A fluid cleaning and filtering system includes a pre-treatment system before a force generation turbine to condense and pretreat gases and particulate matter; a flow rectifier before a tangential inlet; diffuser pipes for compressing the gases and particulate matter therein and project same into the deflector disks, diffuser pipes at an outlet of the so-called condenser, a purger, a diffuser and a deflector; a force generation turbine; an energy generator using torque from the turbine rotor; an internal energy generator; a flow rectifier in a first tangential inlet and a flow rectifier in a second tangential inlet; a new full-cone atomizer nozzle to wet particles and clean gases; a diffuser in the condensers and a deflector disk for the condensers.

3 Claims, 15 Drawing Sheets

(51) Int. Cl.
  *B01D 45/14*   (2006.01)
  *B01D 53/18*   (2006.01)
  *F01D 15/10*   (2006.01)
  *F01D 25/00*   (2006.01)
  *F01N 3/033*   (2006.01)
  *F01N 3/037*   (2006.01)
  *F01N 3/08*    (2006.01)
  *B01D 47/05*   (2006.01)
  *B01D 50/00*   (2022.01)
  *F01N 3/04*    (2006.01)
  *B01D 45/00*   (2006.01)

(52) U.S. Cl.
  CPC ............ *B01D 47/05* (2013.01); *B01D 50/00* (2013.01); *B01D 53/18* (2013.01); *F01D 15/10* (2013.01); *F01D 25/002* (2013.01); *F01N 3/033* (2013.01); *F01N 3/037* (2013.01); *F01N 3/04* (2013.01); *F01N 3/0821* (2013.01); *F01N 2240/22* (2013.01); *F01N 2290/04* (2013.01); *F01N 2610/1453* (2013.01); *F05D 2220/32* (2013.01); *F05D 2220/76* (2013.01)

(58) Field of Classification Search
  CPC . F01N 2610/1453; F01N 3/033; B01D 45/00; B01D 45/08; B01D 45/14; B01D 47/05; B01D 50/00; B01D 53/18; B01D 53/78; B01D 2252/103; F01D 15/10; F01D 25/002; F05D 2220/32; F05D 2220/76
  USPC .................. 60/295, 297, 320, 309, 310, 311
  See application file for complete search history.

(56) References Cited

FOREIGN PATENT DOCUMENTS

| | | | |
|---|---|---|---|
| NO | 162530 | 10/1989 | ............... F01N 3/04 |
| RU | 2227833 | 4/2004 | ............... F01N 3/04 |
| WO | WO9956854 | 11/1999 | ............ B01D 51/00 |
| WO | WO2010091490 | 8/2010 | ............ F01N 3/037 |

OTHER PUBLICATIONS

International Search Report (w/translation) and Written Opinion (w/machine translation) issued in application No. PCT/BR2018/050028, dated Jun. 29, 2018 (18 pgs).

SYSTEM FOR CLEANING GASES AND SEQUESTRATION OF PARTICULATE MATERIAL FROM INTERNAL COMBUSTION ENGINES WITH CONVERSION OF WASTE INTO EXTRA ENERGY

CROSS REFERENCE TO RELATED APPLICATION

This application is a continuation-in-part of PCT International Patent Application Serial No. PCT/BR2018/050028, filed Feb. 9, 2018, the entire contents of which are incorporated herein by reference.

The present invention, called GLR TECH (or simply GLR) refers to energy generation by means of the waste of internal combustion engines, energy storage or the possibility of targeting other purposes, a device and method for providing filtering and separating solid and inhalable particles contained in the flow of hot exhaust gases of internal combustion engines, particularly diesel engines, as well as cooling and cleaning of said exhaust gases so as to drastically reduce the release into the environment of polluting compounds such as carbon monoxide, nitrogen oxide and sulfur dioxide containing carcinogenic substances and capable of penetrating into the lungs when inhaled.

History of the Intellectual Property of GLR TECH System:

This specification presents innovations and enhancements of GLR TECH, and maintains and updates the relevant part of our prior patent with the technologies that are still efficient. For the record, the prior application was BR1020130098728. Nevertheless, the innovations of recent years and the great partnership to be initiated for implementation in the market have made necessary the filing of this new application.

In addition to the inventions that were previously presented as inventive, this specification includes significant innovations and strategic changes in layout to enhance the capacity of the technology to generate energy and increase efficiency in cleaning polluting gases and microparticles. Such innovations and changes can be found in this specification on pages 10 and 11 of Portuguese document (paragraphs 0051 to 0054) and on pages 18 and 19 of Portuguese document (paragraphs 0105 to 0111) have been claimed, presented in new designs (FIG. 8 to 18) and mentioned in the last paragraph of the abstract about the GLR TECH as well.

BACKGROUND OF THE INVENTION

It is known from the state of the art that diesel engines produce hot exhaust gases containing polluting particulate material in the form of fine particles that are difficult to remove either by filtration, such as mechanical separation in cyclones, even when subjected to centrifugal forces.

The device (GLR TECH System) is configured and coupled by a method which recycles the waste of energy (heat exchange) generated by all the Otto-cycle and Diesel-cycle engines. As for the operating principle, the internal combustion engines are divided into: Otto cycle (gasoline, ethanol, CNG); Diesel cycle (diesel oil, biodiesel and heavy oils such as LFP). Both in Otto and Diesel cycles, waste is at about nominal 55% and the main power loss occurs due to heat exchange (exhaust) in stage 4 (loss of 36.6%), ranging from fuel to fuel. The internal combustion engines reach high temperatures, which results in inevitable energy losses, the most frequent being forced cooling, supply unit, lubricant oil, piston cooling and cylinder cooling.

Thesis (Cause and Effect)

However, we found it is possible to convert this power loss caused by the heat exchange into mechanical energy and then into alternate and direct electric energy, the direct one for bus, trucks, ships batteries and power plants, and the alternate one to residences, rooms and refrigerated rooms, cold chambers, supermarkets and other devices and units that require alternate current. Further, simultaneously with the generation of mechanical energy, the cleaner of GLR TECH system will sequestrate particulate materials, clean gases and even will debug simulate acid rain enclosed for later treatment when acidification becomes critical. In the case of waste water of this process, it may be discharged in treatment plants for gas stations or containers from where it will be collected, treated and returned to nature.

The energy generated by the GLR TECH System by using the waste of internal combustion engines, will feed conventional batteries and future lithium (lithium-ion) and silicon batteries, since they work in direct current and can be converted into alternate current. Also, we may use other more advanced batteries. The efficiency of the batteries (weight and capacity) still is a technological barrier, but not in our case because the generating source is continuous, arising from the fourth stage (technically called FOURTH STROKE—EXHAUST). At this stage, the gases are expelled (expansion) at high pressure, heat, volume and overheated particulate material (expansion). Our technological innovation starts here.

The engine has a capacity defined in terms of power, HP (Horse-Power) or CV (cavalo-vapor). HP or CV is the indication of the amount of work that it is capable of accomplishing in the time unit.

By definition, 1 HP is the power necessary to raise to the height of one foot, in one second, a load of 550 pounds, and 1 CV is the power necessary to raise to the height of one meter, in one second, a load 75 kg. That is: 1 HP=550 lb-ft/sec and CV 1-75 kgm/sec. If the time unit used is the minute, we multiply 550×60 and have 1 HP=3.0 lb-ft/min and 1 CV=75×60=4,500 kgm/min.

Upon developing a thermal flow diagram of a diesel engine of great piston displacement with a turbocharger driven by exhaust gases and forced cooling, we have:

Heat adducted of 1508 Kcal/CVh with PE=8 kp/cm². In this case, 41.5% of the heat would turn into useful power, 22.4% would be exchanged with the cooling water and 36.1% would exit with exhaust gases. In our system, we use pressure, volume and superheated gases containing particles to generate electricity by means of a turbine. Regardless of its geometric technology, clockwise or anti-clockwise operating system and with or without various stages, the technology will be essential for land vehicles, each with its body layout, cargo ships, tankers and small, means and large generators, thermoelectric plants and other engines using diesel.

By taking advantage of the driving forces of the exhaust gases, a waste corresponding to at about 36% (heat exchange) of the nominal power, we drive a turbine that will initiate the entire process operation of the so-called GLR TECH invention. The system has mechanical, physical and chemical principles, filters particulates (black smoke), washes and cleans gases harmful to the atmosphere, eliminates excessive heat released by the exhaust pipes, dramatically reduces noise in vehicles in large cities and metropolitan areas, and, moreover, it generates electricity. The GLR TECH system is sustainable mainly by operating by means of the waste heat exchange (expansion) at about 180° C., approximately, which can vary according to the environment, altitude, temperature, size and engine power. In addition to capturing particulates harmful to human health, cleaning gases, reducing noise and lessening the outlet temperature of the exhaust, the technology also has the function to simulate/anticipate acid rain and prevent it from happening in the atmosphere. Currently, acid rain pollutes the land, seas, oceans and forests and reducing the same in the atmosphere through the GLR TECH will be essential for a more sustainable and consequently healthy world.

Continuing still a little more about acid rain, we provide some trivia before addressing to the merit of the operation of GLP TECH system. Acid rain: the burning of coal or oil release gaseous waste (nitrogen oxides and sulfur are some of them), and the reaction with water of these substances form nitric acid and sulfuric acid, which are present in the acidic rain precipitation. Air pollutants are carried by the winds and travel thousands of kilometers. Thus, acid rain can fall at great distances from polluting sources, impairing other countries.

Due to the acidification, soil is impoverished, vegetation is compromised, and organisms in rivers, lakes and oceans are adversely affected, compromising the food chain and fishing. Even marble monuments are gradually eroded by acid rain. Thousands of cargo ships around the globe produce Pollution equivalent to world car fleet and accounts for 70% of worldwide transport by sea and river waters. A midsize ship burns 3,000 kilograms of crude oil to 5,000 kg per hour. Some of them direct their exhausts to the ocean (cruise ships, to hide the black smoke) and cargo ships use electrostatic concentrators so that when night comes, they release gases into the ocean or into the atmosphere.

Damages to Man

Health: Acid rain releases toxic metals that are on the ground. These metals can reach rivers and be used by man to erect buildings, houses and architectures, causing serious health problems. Acid rain also helps to erode the materials already used in buildings, even destroying dams and hydroelectric turbines.

Damages to the Environment

Lakes: Lakes can be quickly damaged by the effect of acid rain, since they may be completely acidified and lose all their life.

Deforestation: Acid rain causes clearings, and, in a forest with many trees, clearings can continue to increase until the forest destruction.

Agriculture: Acid rain affects plantations almost the same way as the forests, except for the faster destruction of the former, since the cultures are similar, and thus having more areas affected. Phytoplankton (phyto=plant, plankton=wander) are plants composed of a single cell that live in surface ocean water. Most of these plant cells are drifting in the ocean waters, but some can move a little alone. Phytoplankton uses sunlight, carbon dioxide ($CO_2$) and water, to produce the substance that it consumes and that serves to create itself: the photosynthesis.

Through this process, phytoplankton manufactures oxygen, which is necessary for survival of the species on the planet. These unicellular organisms absorb as much carbon dioxide as land plants and, therefore, help regulate our climate. Scientifically, from what we know, phytoplankton are $CO_2$ sequesters and the largest oxygen plant ever discovered by scientists. We have no equipment or scientific knowledge until now to sequester $CO_2$ in this way, without a trace. There are two proven effective ways: the one above or new developing plant and forests. Scholars and scientists warn: if we lose 40% of plankton on our planet, the disaster will be worse than the extinction of the dinosaurs. The pH of the ocean, modified by acid rain, also affects the development of the zooplankton.

Therefore, if we prevent the proliferation of acid rain, we will maintain water healthy, and phytoplankton production will benefit. Otherwise, the less phytoplankton, the greater the risk of a cataclysm on the Earth planet. The aforementioned ionization occurs in atmospheric water droplets (clouds, fog and mist), in water in the ice surface or snow crystals and also in dew and water absorbed into solid particles suspended in the air. It is due to this multiplicity of ways of formation that the term acid rain, although very widespread, should preferably be replaced with acid deposition. Acidification of precipitation with all the resulting environmental consequences can occur even in the absence of rain. This is where the inventive system comes in, since inside the GLR TECH cleaner there is a kind of inner simulator of acid rain, sequestering the acidification, treating the same and returning free-acid water to nature.

As a result of this natural acidity, the limit so the precipitation is to be considered as acid generally is a pH of less than 4.5 (at 20° C.), which corresponds to a precipitation containing measurable concentrations of one or more strong acids and that due to the acidity causes proven negative effects on plants, aquatic organisms and built structures and devices which it contacts.

Every internal combustion engine, whether it uses fossil or an alternative fuel will be saturated (high acidity level) at a given time. There are ways of treating gases and particulate material retained by the system deposit.

Although each engine and its maintenance may vary, in general the way of treatment will be as follows: a truck is fueled with 800 kilos of diesel and has a path traced with 4,500 km consuming one liter of oil per 5.6 km, from point A to point B, covering 4,500 km. There will be a need to change the water of the GLR TECH container and consequently fuel the vehicle (as mentioned here, a bus or truck according to the amount of diesel consumption). This water will be deposited in underground silos, without danger of contamination of the water table, where a local cooperative will collect, if there were large clusters of small towns.

In the case of large cities, where the stations have the infrastructure and resources for financing, treatment plants called wastewater treatment plants may be created (as widely used in chemical industries in general). The treated water will be analyzed and returned to the soil or the hydric system of the region without impairing the nature, and, on the contrary, helping local irrigation and avoiding drought as an economical and effective technology. In many situations, the most effective way to control the emission of $SO_2$ is a process gas removal before its release into the atmosphere. Almost all commercial treating processes are based on the removal of $SO_2$ via suitable alkali, for example, limestone (calcium carbonate), lime (calcium oxide) and ammonia, thus creating a mixture of salts of sulphites and sulphates.

Several technological processes for desulfurization of gases (FGD) have been developed and marketed. However, two of the most common systems account for over 95% of the world capacity, which are: a humid process, using limestone as a reactant, and a semi-dry process, using lime as a reactant, which are economically viable in gasoline and diesel stations. In the near future, there could be a treatment plant at each gas station, bus garages and trucks, including ships, treatment and reuse of water plants, since there is usually enough space to do so.

Pollution has been a major environmental problem and acid rain is one of the most relevant aspects thereof. In fact, rain is naturally acidic due to the atmospheric carbon dioxide and volcanic eruptions exuding sulfur oxides. However, there are excessively acid rains, resulting from the burning of fossil fuels in internal combustion engines used in boilers and industrial generators, homes, vehicles, and most seriously in thermoelectric plants. Each of the large power plants, on average, pollute almost the car fleet of a city with 400,000 inhabitants. Natural environments take some time to respond to attacks, such as acidification, for water and soil have ability to neutralize acids and bases and only after exhausting these possibilities, the environment suffers a marked change. With increased acidity, toxic metals such as aluminum, manganese and cadmium are solubilized causing serious problems for ecosystems. When waste water is discharged untreated into rivers, lakes and oceans, causing pollution with serious consequences for the ecosystem, this water must be treated before returning it to the environment, which is done in Waste Water Treatment Stations. The stations may use several resources available in chemical engineering, chemistry, bio-chemistry and even purely biology.

In view of the drawbacks and deficiencies of the solutions known hitherto for reducing pollutants in exhaust gases of diesel internal combustion engines, it is an objective of the present invention to provide a filtering and cleaning device of said gas exhaustion, of relatively simple and compact construction, which can be easily installed in vehicles or in stationary driving units, allowing the attainment of a high degree of retention of particulate material and toxic gases from the flow of gas exhaust from diesel engines. In order to solve these drawbacks, the present invention has been developed, which can be proven to clean up and purify gases and generating electricity.

Exhausts: Another factor that is relevant and impactful to the environment is the operating temperature in the fuel combustion process in the engine, which reaches about 800° C. Consequently, the soot exits burning out at a temperature in the range of 400° C. This temperature is sufficient to cause the fire in the dry grass on highways and cause fires of catastrophic proportions, as well as overheating of cities around the world regardless of the height or area relative to sea level.

Bus fleets and millions of trucks in Brazil (trucks are responsible for the majority of the Brazilian transportation), output their exhaust directed to the right, left, down and rarely up. The output of exhaust into the right side provides the beginning of burning the right side of the road when the truck approaches the roadside, and the exit to the left provides the burned on the left side of the road when the truck is overtaking. Consider the heat that a bus fleet can cause in a city like São Paulo with all running at the same time. It generates the phenomenon called metropolitan greenhouse effect, where the buildings and the asphalt absorb this heat, then creating a low layer of unbearable thermal feeling of up to 50° C. The GLR TECH invention will reduce that temperature approximately to the same as natural environment.

Measures such as control of vehicle circulation, development of cleaner engines, installation of industrial filters and the constant pursuit of the development of alternative fuels have been implemented.

However, current catalysts, as well as the so-called oxy-catalysts, designed to reduce pollution from diesel and gas combustion, fall short, since they reduce engine power and do not achieve the required efficiency. If indeed the efficiency was proved to be enhanced, millions of tons of various harmful gases would not still be dumped to the atmosphere.

There are also known some methods aimed at cleaning said exhaust gases that comprise the procedures of directing the flow of exhaust gases passing through a conduit including a converging and diverging Venturi, and supplying water to the throat region of the Venturi, and then separating, from the exhaust gases, water with solid particles and dissolved gases.

Although proposing humidification the particulate material and gases contained in the exhaust flow to increase the weight of the humidified particles and dissolve the pollutant gases, this method does not achieve satisfactory results because it does not allow effective humidification of particulate mass, which remains with its original surface area. Furthermore, the water spray in the Venturi region does not produce an adequate and homogenous mixing of the water with the gases and particulate material, reducing the degree of dissolution of gases and increasing the density of the particulate material, with negative effects on the efficiency of the separation of solid particles and washing of toxic gases. This type of solution is treated in the patent documents NO-B-162 530 and GB 2,300,024.

WO 99/56854 (PCT/DK99/00237) describes a method and device for separating solid particles from a hot gas flow of exhaust from a diesel engine.

In this prior solution, the exhaust flow has its relative humidity increased by water atomization, being cooled to a temperature close to its dew point and then accelerated by reducing the cross-sectional area of the conduct or by a turbine, sot that a further reduction of the condensation temperature and water vapor occurs, causing the solid particles to become encapsulated in condensate droplets that can be separated from the exhaust flow by cyclone or gravity.

The above-mentioned proposal presented in WO 99/56854 suggests that the mixed gas flow (containing gases and particulate material) is simultaneously humidified and cooled and then accelerated again to provide sufficient cooling for the condensation of water vapor and enclosing of the solid particles by condensate droplets, allowing the separation of particulate material and gases dissolved in the liquid phase of said mixed flow.

This previous solution also does not suggest any additional treatment of the humidified mixed flow, aiming at to homogenize its humidifying and cooling to achieve a greater degree of retention of particulate material and toxic gases.

The patent application PI0502332-7 of the same inventor proposes a device facing the same functional objective and that subjects the flow of exhaust gas to an initial step of centrifugation of the mixed flow before humidifying and cooling said mixed flow, which is then subjected to the subsequent steps of diffusion, expansion, deflection and disintegration, overflowing the new cooling of the gases before the release into the atmosphere.

In addition to being complex and difficult to implement in motor vehicles, the proposed device in this previous application for Brazilian patent did not lead to an elimination of virtually all, particulate material and toxic gases from the exhaust flow released into the atmosphere.

SUMMARY OF THE INVENTION

In view of the drawbacks and deficiencies of the solutions known hitherto for reducing pollutants from exhaust gases of diesel internal combustion engines, the objective of the GLR TECH System is to provide a filtering and cleaning device of said exhaust gases of relatively simple and compact construction, which can be easily installed in vehicles or in stationary driving units, allowing the attainment of a high degree of retention of particulate material and toxic gases from diesel engine exhaust gas flow, in addition to simultaneously generating energy.

It is a further objective of the present invention to provide a device as defined above and that allows the flow of, the exhaust gases to be released to the atmosphere at a temperature not exceeding about 30° C. to 40° C. above room temperature.

It is a still further objective of the present invention to provide a device as defined above and that allows the collection of particulate material and toxic gases dissolved in an aqueous wash system in a closed loop.

It is a further objective of the invention to provide a method for filtering and cleaning of exhaust gases of a diesel engine according to the above-defined purposes.

According to a first aspect of the invention, the filtering and cleaning device of exhaust gases of internal combustion engines, especially diesel engines, comprises:
  a means of pre-treatment for pre-humidifying and pre-cooling with atomized water the flow of hot exhaust gases of the engine;
  a homogenized flow means for swirling said flow of exhaust gases, and homogenize the same;
  at least one treatment means for providing humidification with water, of the flow of homogenized exhaust gases, process called shearing of solid particles. There will also be a compression at a pressure of about 8.0 kg/cm$^2$ and that can reach about 1.2 times the discharge pressure of the engine;
  a exhausting means that receives the gas flow under negative pressure of the treatment means and leads said gas flow to a descending path, by a lower outlet of water release and exhaust gases containing water vapor and solid particles;
  a condenser means for receiving the flow of exhaust gases of the exhausting means, providing the water vapor condensation and its capture with the entrainment of particulate material and toxic gases and the release of the cleaned exhaust gas flow to the atmosphere.

The pre-treatment, treatment and condenser means are fed with water from a water source, generally a tank, and the uptake of water and condensate of entrainment of particulate material and dissolution of toxic gases will be performed into a collection reservoir.

According to a second aspect of the invention, the method of filtering and cleaning of exhaust gases of internal combustion engines, especially diesel engines, comprises the steps of:
  subjecting the flow of engine exhaust gas to a pre-treatment for pre-humidifying and pre-cooling the same with water;
  subjecting the pre-treated exhaust gas flow to swirling to promote homogenization;
  subjecting the pre-treated and homogenized exhaust gas flow to a treatment for promoting water humidification, to shear the solid particles contained in the exhaust gas flow and compression of the latter to about 8.0 kg/cm$^2$, reaching about 1.2 times the pressure of the engine exhaust, to release said gas flow after the compression;
  drawing in negative pressure the flow of exhaust gases released by the treating means and leading said flow of exhaust gases to a descending path, by an outlet of water release, solid particles and exhaust gases containing water vapor and solid particles.

With the device and the process as defined above in their basic aspects, it turns to be technically and economically feasible to treat the exhaust gases of internal combustion engines, particularly diesel engines, with a virtually complete retention of the particulate material and dilution of toxic gases contained in the flow of hot exhaust gases, which are further released at low temperatures, usually only slightly above room temperature, with a great reduction of usual odors of these gases and noise level of the exhaust pipes.

By applying the present invention, the exhaust of internal combustion engines, particularly diesel engines mounted on vehicles or stationary releases to the environment, a flow of cleaned gases at low temperatures and substantially odorlessly, gases that are non-harmful to health and free of toxic gases and particulate material, including if inhaled.

The equipment in question, operating according to the methodology described here and being applied to the discharge of an engine exhaust gases of a diesel engine of 340 CV, year of manufacture 1993, allows achieving the cleaning indexes of exhaust gases and retention of particulate material, as defined below. The exhaust gases were analyzed in a gas analyzer equipment model XL-350, Testo Brazil. The observed results were as follows, with the engine being fueled with diesel as conventionally available in Brazil:
  (NOx)—77%
  (NO)—78%
  (NO$_2$)—49%
  (CO)—33%
  (SO$_2$)—78% particulate materials (PM)—80%

As can be seen from the exemplary results above, the invention allows to obtain high efficiency in terms of filtering/retaining particulate material and purification of toxic gases from an exhaust flow an internal combustion engine burning an oil fossil fuel.

Technological Improvements: Innovations Since the Filing of the Previous Patent Until Present Day.

The latter patent discloses all the requirements for a good performance and functioning regarding what is proposed in the specification: gas cleaning and collection of particulate material from the internal combustion of the diesel cycle and also the co-generation of simultaneous electric energy (direct current and alternate current). However, by means of research and experiments over the years, we concluded that we can improve the efficiency of the whole equipment, and provide better filtering and cleaning of gases and capturing particulate material with the addition of a device and change of flow layout.

There follows an example: The distributor reaches high temperatures in its output at the fourth stage, which raised the idea of approaching the maximum of driving torque generating turbine from the fourth stage, called Torque Generator Turbine (TGEF), and then a "Y"-pipe after the output of so-called TGEF. This meets the equipment mentioned the specification above or can be directed to a boiler, with about 800° C., producing enough steam to generate electricity and consequently mechanical energy. Stages: The "Y" will lead to a high-pressure boiler and superheated gases or follow in direct flow through a device called the diffuser-baffle-condenser-purger (DDCP); thus, there would be a first pre-cleaner of gases and collection of particulate material and condensation before passing through the torque generator. Still mentioning, in the DDCP equipment, compressed gases and PM would direct flow to the water tank (mini-treatment and filtering station). It is emphasized here that such equipment is composed of several full cone atomizing nozzles that provide cooling and condensation, and the condensed water flow goes to the tank by gravity and a type of a suitably-dimensioned flow rate purger. Accordingly, and turning back to the "Y" piping design, a pipe branch goes to the boiler and the other to the TGEF.

The torque generating turbine is powered by the sum of the gas speed, temperature and pressure. In the turbine outlet, the GLP TECH is already generating electricity and filtering, since the core is composed of an internal generator and two gas scrubbers and particulate trap. After the gas flow passes through the TGEF, the flow will continue directly to two mini-condensers also connected to the water tank. Conclusion: there will be a minimum of pollutant gases and particulate material in the turbine, there simultaneously occurs gas debugging, PM capture and co-generation of energy. It is important to take into consideration that the internal generator of electric energy will have no contact with the two devices responsible for debugging gases and capturing particles. Therefore, nothing will prevent the internal generator from running in the fourth stage at the end of the exhaust pipe.

A relevance improvement has been presented, wherein it is possible to divert the superheated gases to a boiler or pass gases by the DDCP equipment before entering the torque generator; this will prevent evaporation of water through condensation; there will be a pre-debugging of gases and the capture of particles, significantly increasing the TGEF function and torque, as well as the efficient cleaning of gases.

BRIEF DESCRIPTION OF DRAWINGS

The invention will be described below, with reference to the accompanying drawings given by way of example of one of the possible embodiments of the proposed solution and in which:

FIG. 17 consists of: a rotor, "U" rotor shell to better use friction, generate more force, with flanges input and output with flow rectifier, bearing housing, conventional bearings as needed or magnetic bearings, a labyrinth preventing leakage of the gases subjected to very high pressures, acrylic seals or as needed and drive shaft coupled to the rotor generating power to feed the external generators and the new Inner Energy Generator.

DESCRIPTION OF THE INVENTION

Figure 1:
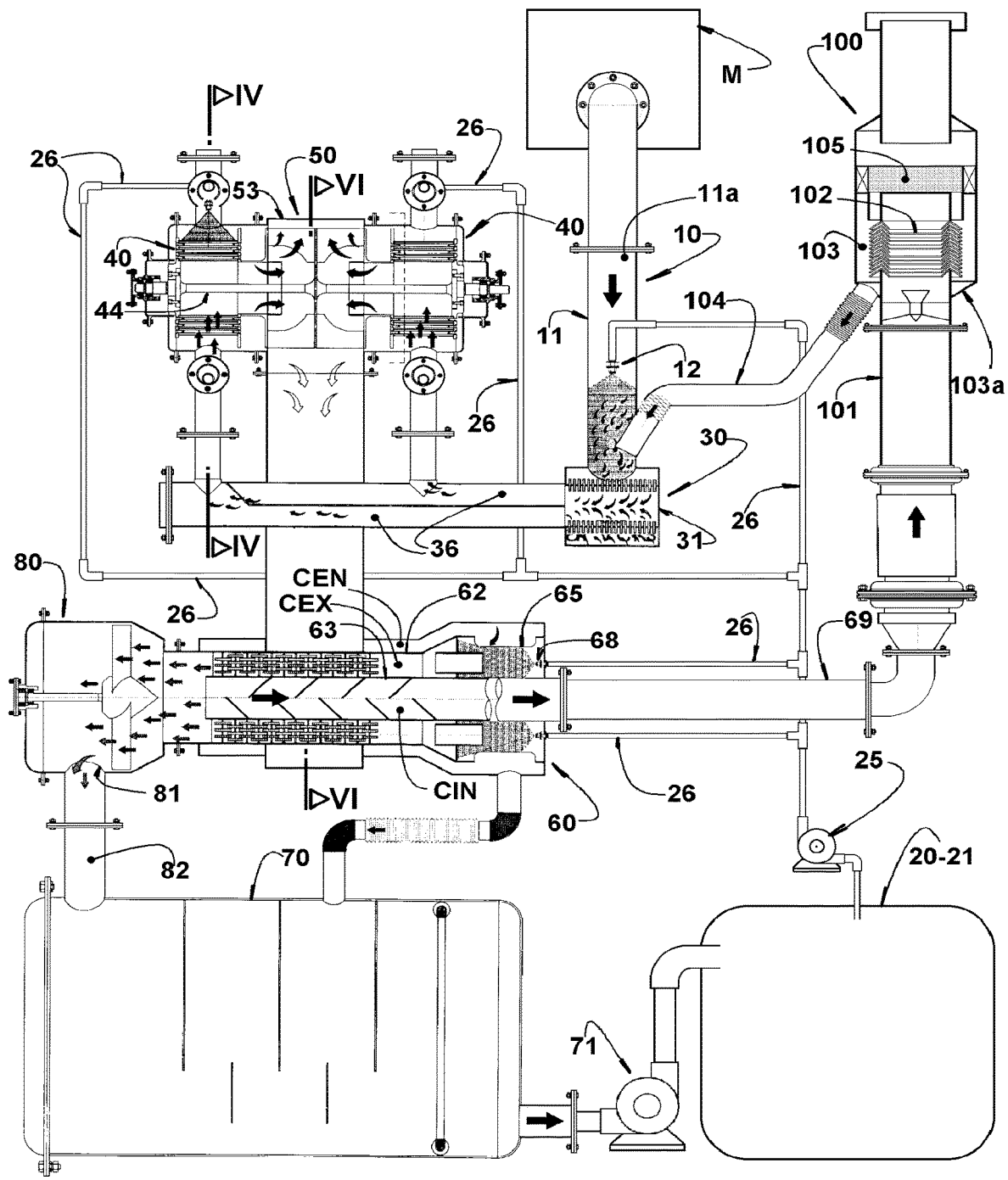
FIG. 1 represents a simple flowchart of the means involved in establishing the device and implementing the filtering and cleaning method of exhaust gases of an internal combustion engine.

As illustrated in the drawings, the filtering and cleaning device for the exhaust gases and particulate materials simultaneously with co-generation of electricity initially comprises means of pre-treatment 10 to pre-humidify and pre-cool the flow of hot gases, released by the internal combustion engine at temperatures ranging generally in the range of about 350° C. to about 650° C.

Figure 2:
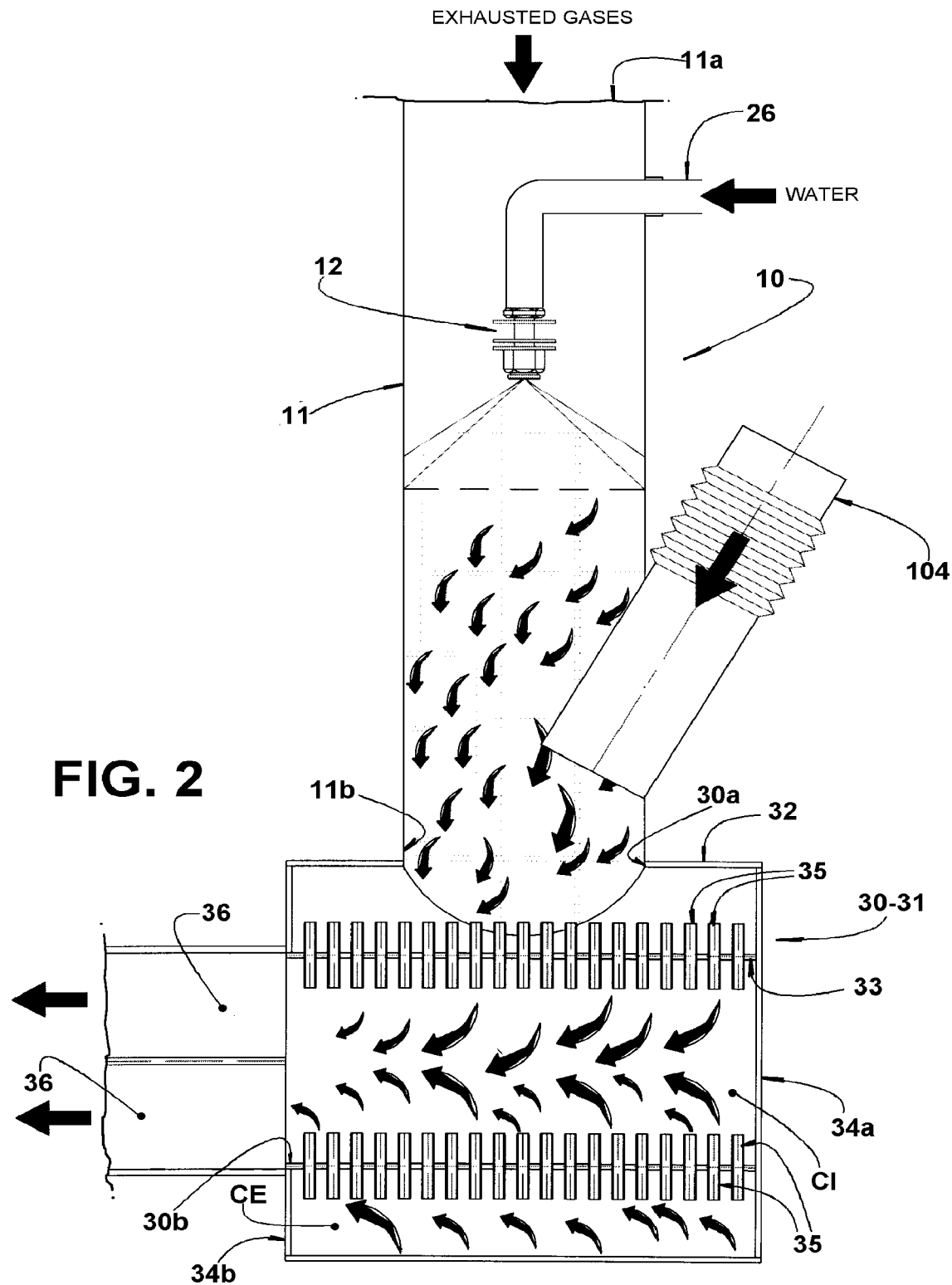
FIG. 2 represents in enlarged scale a longitudinal diametrical view through the pre-treatment and homogenizer of the exhaust gases received from the engine for humidification and cooling.

The means of pre-treatment 10 (see FIG. 2) comprises a tubular portion 11 having an inlet end 11a connected to the discharge of the engine, an output end 1ib, and an atomizer means 12 mounted internally to the tubular portion 11 and arranged to atomize water in the exhaust gas flow received from the engine, with said atomization made in the same direction as the exhaust gas flow.

In this first step of the method of filtering and cleaning of the exhaust gases, the gas flow has the particulate material pre-humidified and all the mass thereof pre-cooled as a function of water atomization, allowing not only the increase of density of particulate material in the exhaust flow, but also the cooling of the latter to a temperature of about 65° C. to about 95° C. lower than the temperature of the incoming gas flow in the device in question.

Water to be atomized in the exhaust gas flow is pumped from a water source 20 (see FIG. 4) which may take different forms, as described later. One form is represented by a tank 21 mounted in the automotive vehicle in which the device in question is installed or any support to the mounting site.

The flow of exhaust gases, already pre-humidified and pre-cooled, is then fed to a flow homogenizer means 30 (referred to in FIG. 4 and detailed in FIG. 2) which is constructed for swirling the exhaust gas flow, causing homogenization.

In the illustrated construction, the flow homogenizer means 30 comprises an annular tubular body 31 (see FIG. 2) defined by an outer tubular wall 32 and an inner tubular wall 33, which define together with end walls 34*a*, 34*b*, an outer annular chamber CE with ends closed by end walls 34*a*, 34*b*, and an inner cylindrical chamber CI with an end closed by one of the end walls 34*a* and the other end open and defining an outlet nozzle 30*b* of the flow homogenizer means 30, which inlet nozzle 30*a* is provided substantially radially through the outer tubular wall 32.

The inlet nozzle 30*a* of the flow homogenizer means 30 may take the form of a volute, to easy the admission of the exhaust gas flow into the outer annular chamber CE, filling and pressurizing the latter and being then divided into multiple radial gas flows which are passed through a plurality of radial pipes 35 arranged through the inner tubular wall 33 and open to the outer annular chamber CE and for the inner cylinder chamber CI.

The construction of the flow homogenizer means 30 is made to cause within the inner cylindrical chamber CI of the annular tubular body 31, a strong swirl of multiple exhaust gas flows passing through the plurality of radial pipes 35, causing a high degree of homogenization of the mass of particulate material suspended in the exhaust gas flow already pre-humidified and pre-cooled. The internal cylindrical chamber CI of the annular tubular body 31 thus defines in its interior a swirling and homogenization region of the exhaust gas flow, said inner cylindrical chamber CI open to the output nozzle 30*b* of the flow homogenizer means 30, which nozzle is open for at least one expansion region 36, to which the already swirled and homogenized gas flow is directed.

The exhaust gas flow already pre-humidified, pre-cooled and homogenate is then conducted, the expansion region 36, usually in the form of a cross section of pipe length not less than that of the inner cylindrical chamber CI to at least one treatment means 40 (see FIG. 4), which is designed to provide a final humidification with water of the flow of exhaust gases, shearing of solid particles and further their compression to a pressure of about 1.2 times the discharge pressure of the engine.

In the illustrated construction, there are provided two treating means 40, arranged in parallel, each receiving a respective portion of the exhaust gas flow released through the homogenizer means 30 through a respective expansion region 36.

Each treatment means 40 comprises at least one rotary compressor 41, with a rotor R having a horizontal axis 44 and multiple compression stages, concentric and maintained in radial fluid communication with each other and disposed within a tubular shell 42 provided with a radial inlet 42*a* generally lower for the flow of exhaust gases, already homogenate and received from the respective expansion region 36 of the flow homogenizer means 30, and a central axial outlet 42*b* (see FIG. 3) to release the flow gas with the particles already sheared, humidified and cooled together with the gas mass.

Also according to the exemplary construction illustrated in the drawings, each stage E of rotor R (see FIG. 4) of the rotary compressor 41 is defined between two cylindrical walls 45, concentric with said stage, wherein said stages E take the form of concentric annular chambers, having the ends of the cylindrical walls 45 respectively fixed to end walls 46 (see FIG. 3) of rotor R, which close the ends of stages E.

Each treatment means 40 (see FIG. 4) is constructed to provide a humidification of the exhaust gas flow. For that, within the tubular shell 42 of each compressor 41 there is provided an atomizer means 43 for water, usually an atomizer nozzle arranged in the upper region of the tubular shell 42, preferably within a radial tubular projection 42*c* of the latter opposite the radial inlet 42*a* of the tubular shell 42.

According to this construction, each rotary compressor 41 carries, externally to the cylindrical wall 45, external to the first compression stage E a plurality of small radial blades 47, arranged to conduct when the rotary compressor 41 rotates, water humidification, sprayed within the tubular shell 42 by the atomizer means 43 contained in the reservoir 43, into the first compression stage E through radial holes 45*a* provided in said outer cylindrical wall 45 of the first stage compression E. It should be noted that the fluid communication between the compression stages E between the last compression stage E and the central axial outlet 42*b* of the tubular shell 42 is defined by a plurality of radial holes 45*a* provided in the cylindrical side walls 45 that limit each compression stage E. The radial holes 45*a* are arranged offset each other every two adjacent compression stages E.

Thus, each rotary compressor 41 has the multi-stage tubular chambers in the form of annular, concentric and radially adjacent to one another chambers, having the ends closed by end walls 46 (see FIG. 3) of the rotor R.

Also according to the construction suggested in the accompanying drawings, each rotor R of a rotary compressor 41 further comprises, at least in part of different compression stages E a plurality of shear rods 48 (see FIG. 4) arranged axially, angularly spaced apart and ends fixed opposite the respective end walls 46 (see FIG. 3) of the rotor R, said rods shear 46 rotating together with the rotor R, so as to come into collision with the solid particles contained in the flow of exhaust gases.

The device in question further comprises a flow rectifier pipe 49 disposed coaxially to the rotary compressor 41 and interconnecting its central axial outlet 42*b* to the radial exhaust means 50.

With the constructive arrangement described above for each treatment means 40, 41 the two rotary compressors are mounted in parallel and coaxial with its central axial outputs 42*b* and converging toward each other. In this construction, the flow of exhaust gases received within the tubular shell 42 is swirled, humidified intensely by mixing with atomized humidification water to the interior of the tubular shell and led through the various stages of compression E when the small radial blades 47 rotate, the gas flow being progressively compressed, passing the first compression stage E, through the radial holes 45a provided on the outermost cylindrical side wall 45 of the rotor R. Thus, the flow of exhaust gases is progressively compressed and humidified, from one stage E to the next, radially innermost, while the solid particles are progressively sheared by shearing rods 48 disposed within each compression stage E. At the end of the compression stages E, the flow of combustion gases, already fully humidified and with its suspended solids already intensely sheared, is released through the central axial outlet 42b and directed to a radial exhaust means 50 disposed generally coaxially to the rotary compressors 41.

Figure 3:
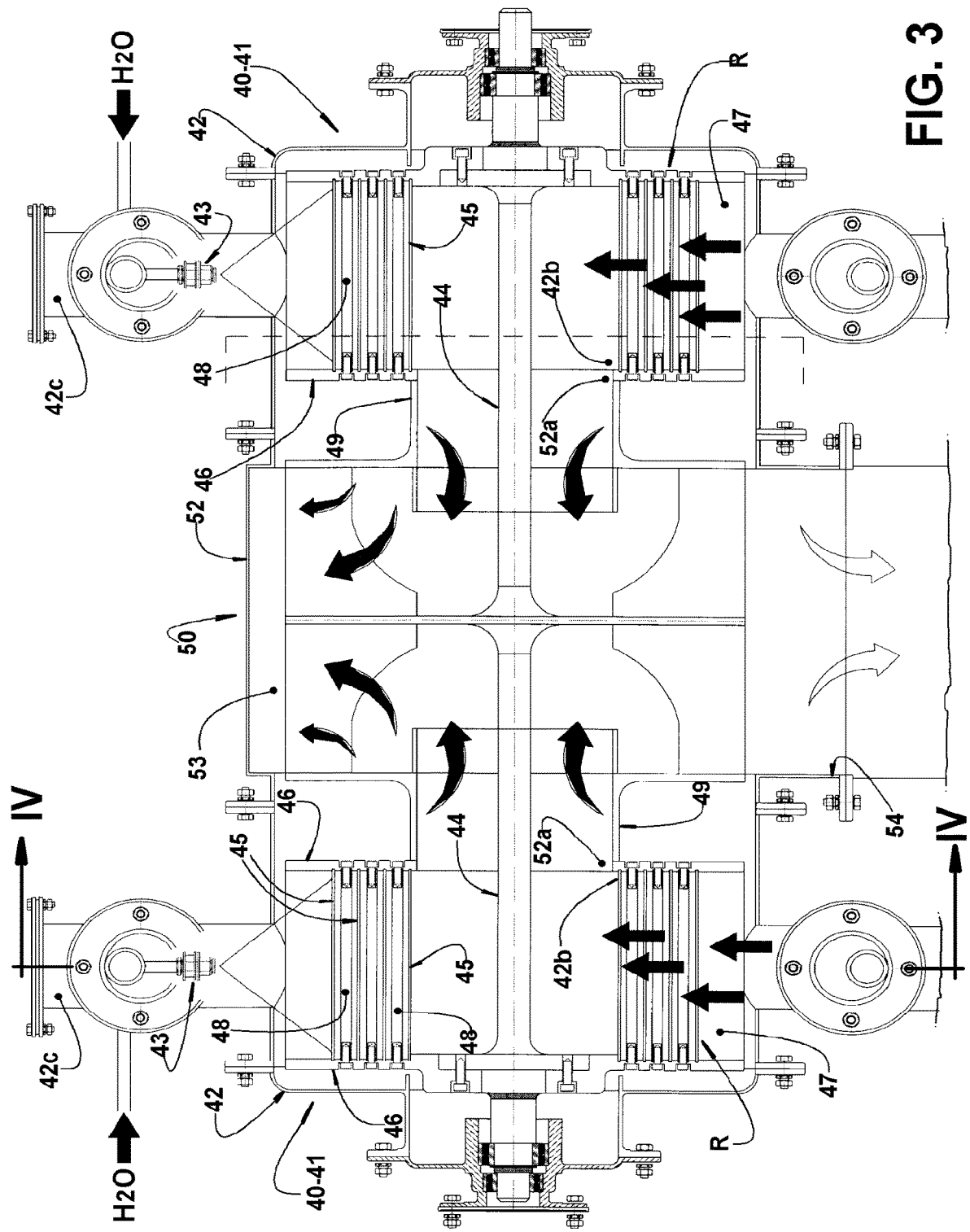
FIG. 3 represents in enlarged scale and in a manner somewhat simplified an axial view of a pair of means of treatment and the exhausting means of the device in question, to provide the final humidification of the exhaust gas flow, the shearing of solid particles contained in said flow and compression of the latter and further the impulse of the exhaust gas flow, means of treatment to the condenser means.
Figure 4:
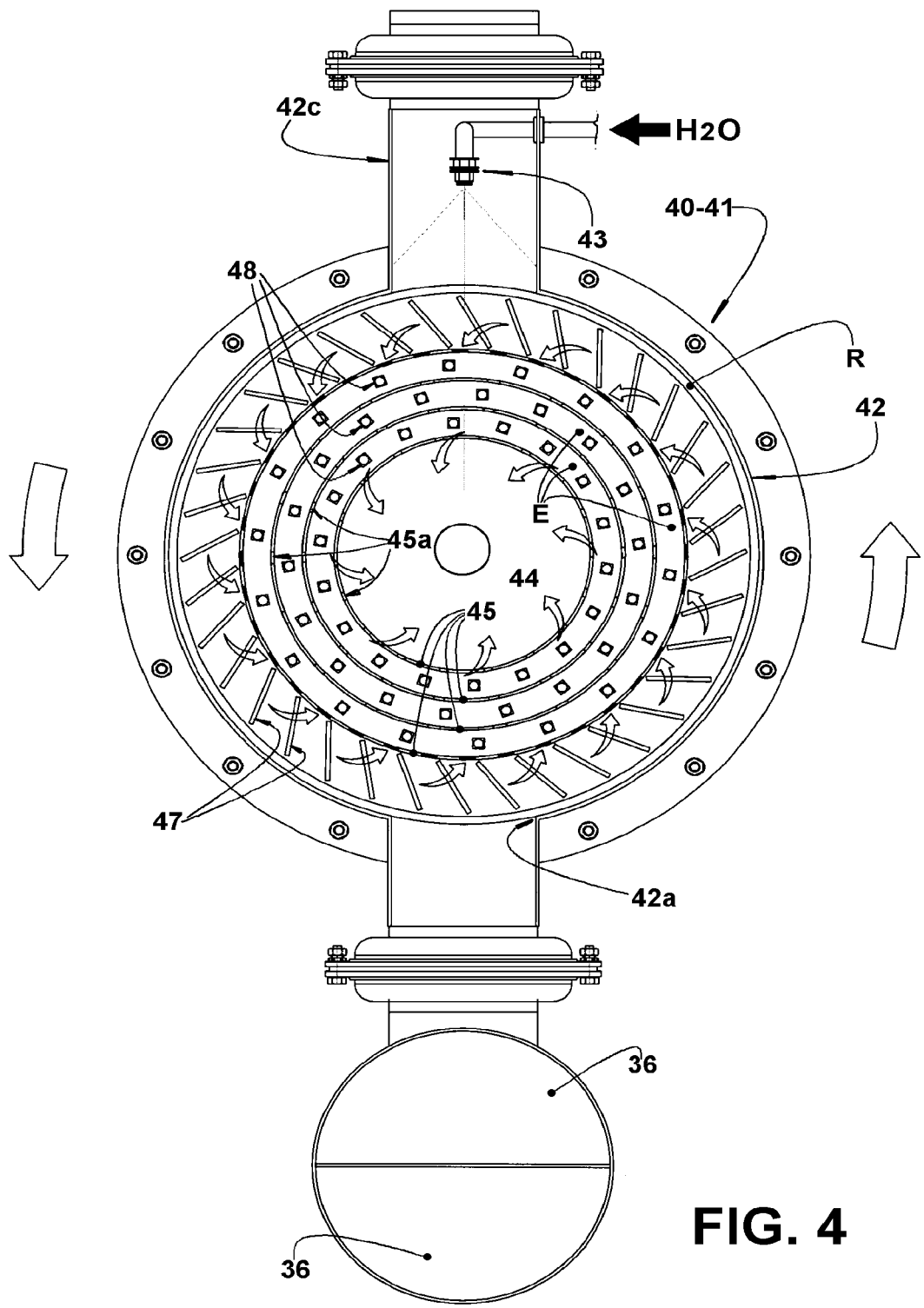
FIG. 4 represents a diametrical sectional view of a treatment means, said section having been taken along line IV-IV in FIGS. 1 and 3.
Figure 5:
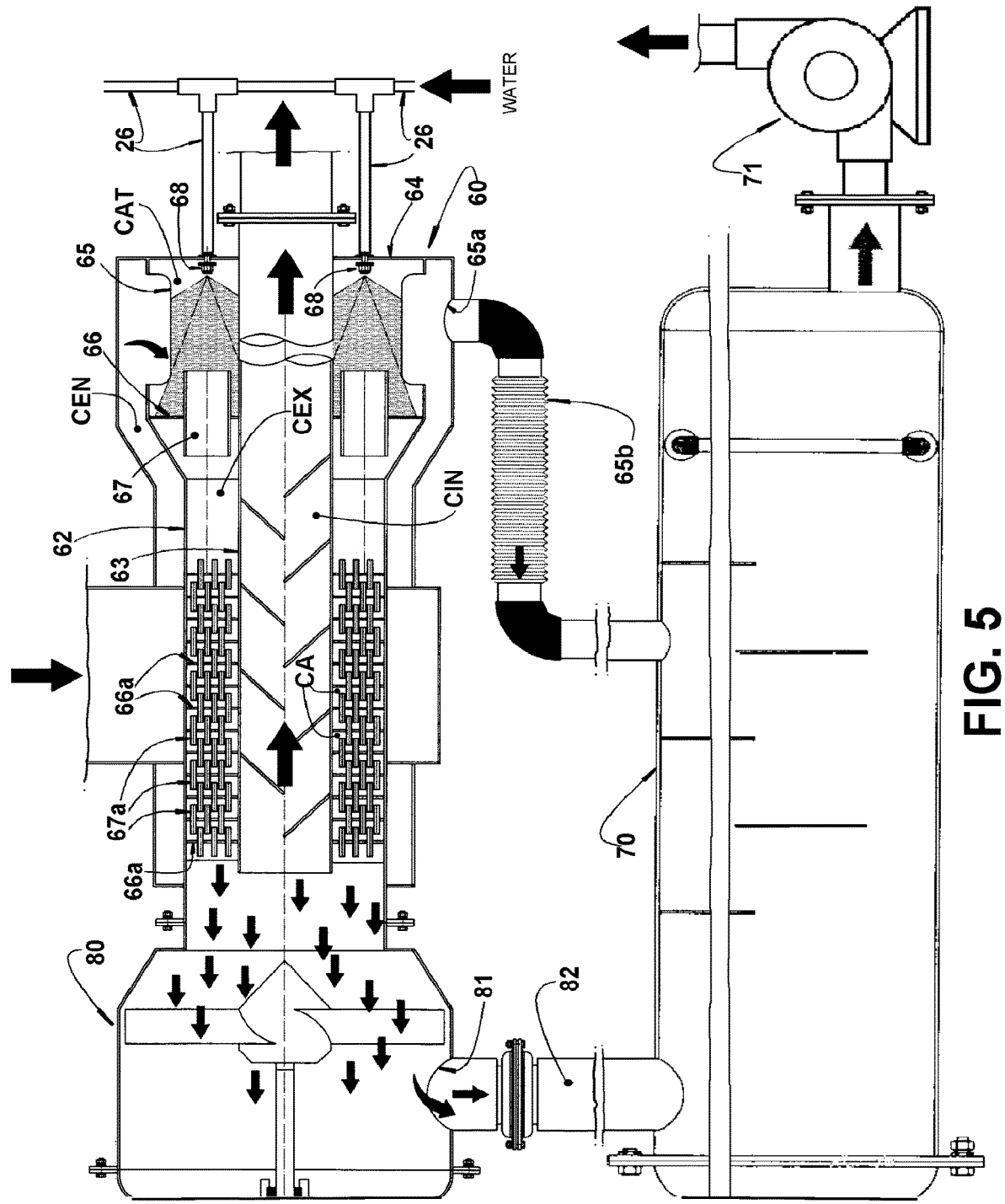
FIG. 5 represents in enlarged scale and in a somewhat simplified longitudinal axial view a condenser means and collection tank.
Figure 6:
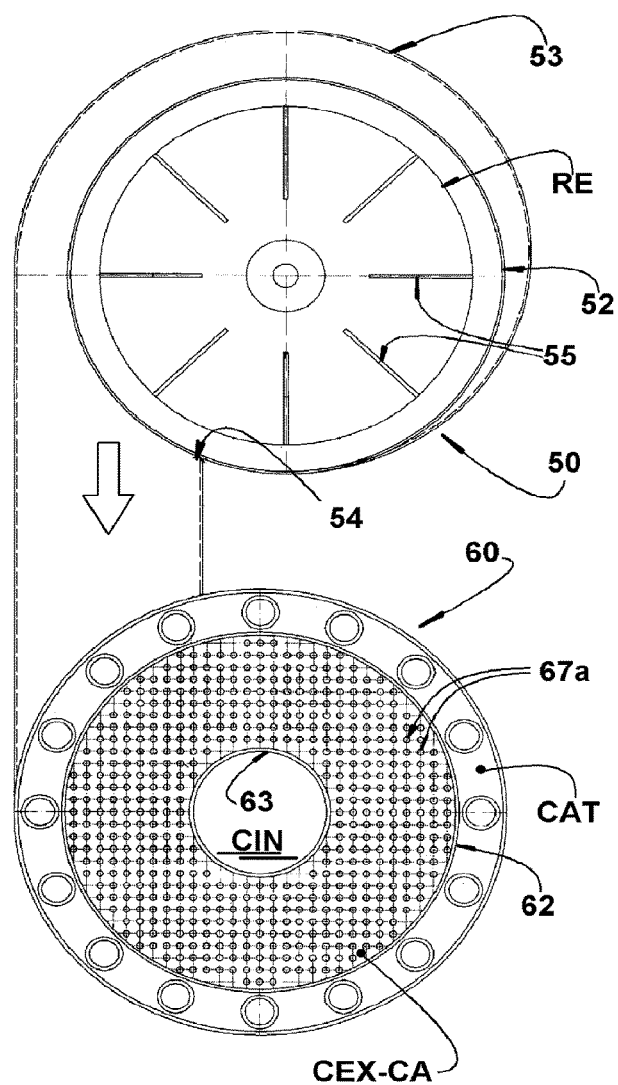
FIG. 6 is a cross-sectional diametrical view, somewhat simplified, of the exhaust and condenser means, said section being taken along line VI-VI in FIG. 1.
Figure 7:
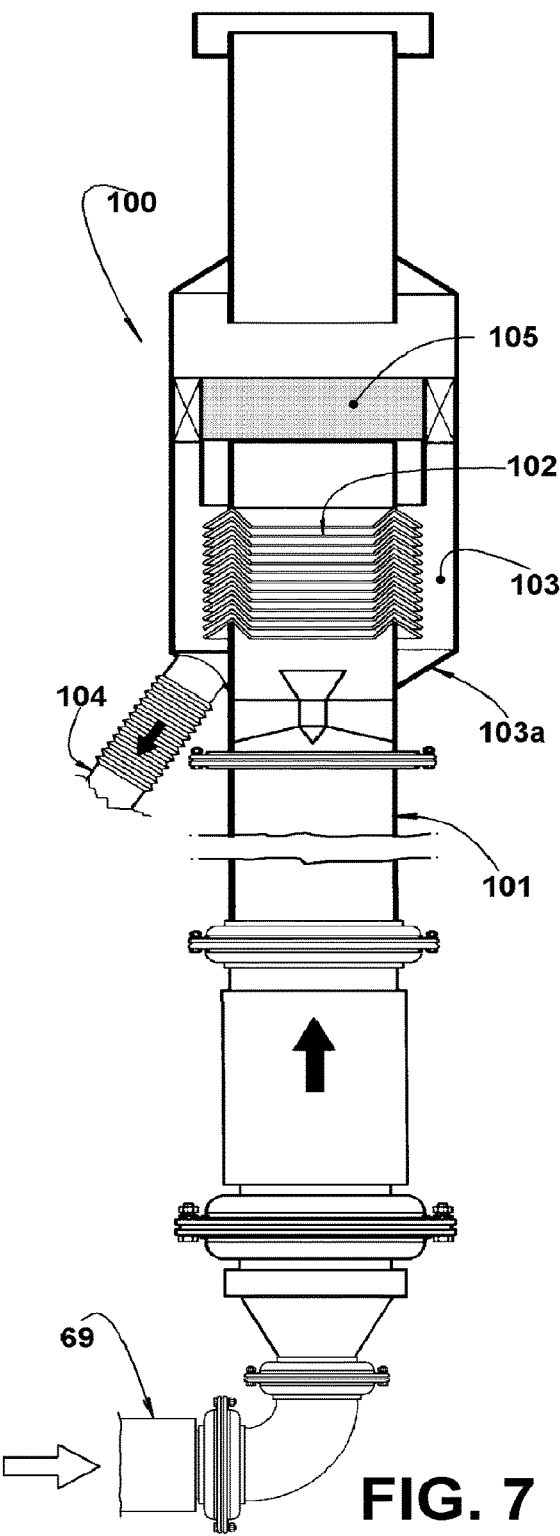
FIG. 7 represents an enlarged longitudinal view of the means of gas liberation arranged downstream of the condenser means.

According to the illustrated construction, the radial exhaust means 50 (see FIG. 6) comprises a cylindrical housing 52 with opposite ends of each attached to a tubular shell 42 of a respective treatment means 40 and housing a rotor RE mounted on the same shaft 44 of the rotors R of the compressor 44 and having, at each end, a central axial inlet 52a (see FIG. 3) to the exhaust gas flow from each treatment means 40 and a plurality of radial fins 55 (see FIG. 6), wherein the cylindrical shell 52 opens laterally to a side volute 53 that defines a lower outlet 54 for the water and exhaust gas containing water vapor and suspended solid particles. As can be seen from FIGS. 3 and 6, the exhaust flow containing water vapor and solid particles is then fed to a condenser means 60 comprising an inlet chamber CEN (see FIG. 1), of elongate tubular annular shape with closed ends arranged horizontally and receives, medially and tangentially, the exhaust gas flow released from the lower outlet 54 through the exhaust means 50.

Internally, the inlet chamber CEN, the condenser means 60 comprises a outer chamber CEX, also elongated tubular annular, horizontally arranged and defined between an outer tubular wall 62, separating the same from the inlet chamber CEN, and an inner tubular wall 63, said outer chamber CEX being closed by an end wall 64 at one of its ends.

The exhaust gas flow admitted to the inlet chamber CEN pressurizes the interior of the latter and is passed to one of the end regions of outer chamber CEX, through a plurality of windows 65 provided in the outer tubular wall 62. In said end region of outer chamber CEX radially aligned with the windows 65, an annular atomization chamber CAT is formed (see FIG. 6), which is separated from the outer chamber CEX by an annular partition 66/66a which is pierced by a plurality of eccentric axial pipes 67 communicating the annular chamber with the atomizing annular chamber CAT with the outer chamber CEX. In the end wall 64 common to the annular atomizing chamber CAT and external chamber CEX, atomizing nozzles 68 are mounted for atomizing water tank 21 into the exhaust gas flow that enters the annular atomization chamber CAT, and the atomization performed in the axial direction facing the eccentric axial pipes 67.

The inlet chamber CEN is inferiorly provided in its region adjacent to the windows 65 of the annular atomization chamber CAT, a lower outlet 65a which is connected by a conduct 65b, to the collection tank 70, to drive, gravitationally, water, condensate and particulate material already released radially and inferiorly of the annular atomization chamber CAT.

The inner tubular wall 63 limits in its interior the inner chamber CIN of tubular shape having an open end to an adjacent end of the outer chamber CEX and the opposite end projecting through the annular atomizing chamber CAT out of the condenser means 60, to be open to the atmosphere or further preferably connected to an exhaust means 100.

The outer chamber is further provided with a plurality of annular partition walls 66a, arranged parallel and spaced from each other transversely to the longitudinal geometric axis of the outer chamber CEX. The partition walls ring 66a define, between them, annular chambers CA held in communication with a plurality of axial pipes 67 disposed through the annular partition walls 66a and radially remaining spaced from the inner 63 and outer 62 tubular walls of the outer chamber CEX and having the ends open and projecting inwardly the respective annular chambers CA, wherein the axial pipes 67a of an annular partition wall 66a axially offset relative to axial pipes 67a of the two adjacent annular partition walls 66a.

With the construction proposed for the means condenser 60, the gas flow, still containing water vapor and remaining particulate material, is passed by the annular chambers CA, progressively condensed and released through the open end of the outer chamber CEX, to a device for breaking droplets 80, provided with a lower outlet 81 connected to a pipe 82 which leads the condensate and particulate material suspended therein to the collection reservoir 70.

The remaining gas flow, already cooled and cleaned, can be released to the atmosphere or further preferably conducted by CIN internal chamber to the exhaust means 100.

It should be noted that the water to be atomized in pre-treatment means 10, treatment means 40 and condenser means 60 is pumped from the water source 20 that, in the illustrated example, is defined by the tank 21. The pumping can be done by any suitable pump 25 and through pipes 26.

The collection reservoir 70 may be constructed in different ways, with or without a means 71 for treating collected water and condensate, for example, by filtration so that the water used in the process is reused in a closed loop, that is, returned to tank 21. This arrangement allows for a great saving of water to be used in the humidification method, without requiring continuous water replenishment in the tank 21, increasing the autonomy of the device, particularly when applied in automotive vehicles.

The means of exhaust 100, when provided, is coupled to the output of inner chamber CIN of the condenser means 60 for receiving the cooled and purified gas flow in the latter and subjecting it to an additional condensation operation, with the main objective of collecting any remaining water in vapor form in the exhaust flow.

In the illustrated construction, the gas flow leaving the condenser means 60 is led through a proper pipe 69 (see FIG. 1), the exhaust means 100 which may take the form of a tubular body 101 arranged vertically, and a lower end 101a connected to the pipe 69 and an upper end open to the atmosphere. In its middle region, the tubular body 101 houses a plurality of annular trays 102, horizontal and somewhat spaced apart, through which the ascending gas flow is passed and the peripheral regions of the annular trays 102 projecting and open to the inside of the collection chamber 103 surrounding the tubular body 101 and having an annular bottom wall 103a from which a drain pipe 104 protrudes downwards having an lower end open into the pre-treatment means 10 downstream the atomizing means 12 and upstream the flow homogenizer means 30. The junction of the drain pipe 104 with the tubular portion 11 of the pre-treatment means 10 is made so that the through-flow of exhaust gas by the latter operates as a ejector producing a pressure drop inside the drain pipe 104 and the consequent aspiration back to the device of any condensate captured within the collection chamber 103, preventing the loss of water used in the process of filtering and cleaning the exhaust gases.

With the proposed construction to the exhaust means 100, the gas flow from the condenser means 60 is passed through the interior of the annular tray 102, in which the remaining vapor water is condensed and radially conducted to the collecting chamber 103 and aspirated back by gravity and pressurized to the pre-treatment means 10. The filter flow 105, usually in a cartridge shape to be periodically replaced, treat the remaining gases so they can be then released to the atmosphere.

Figure 8:
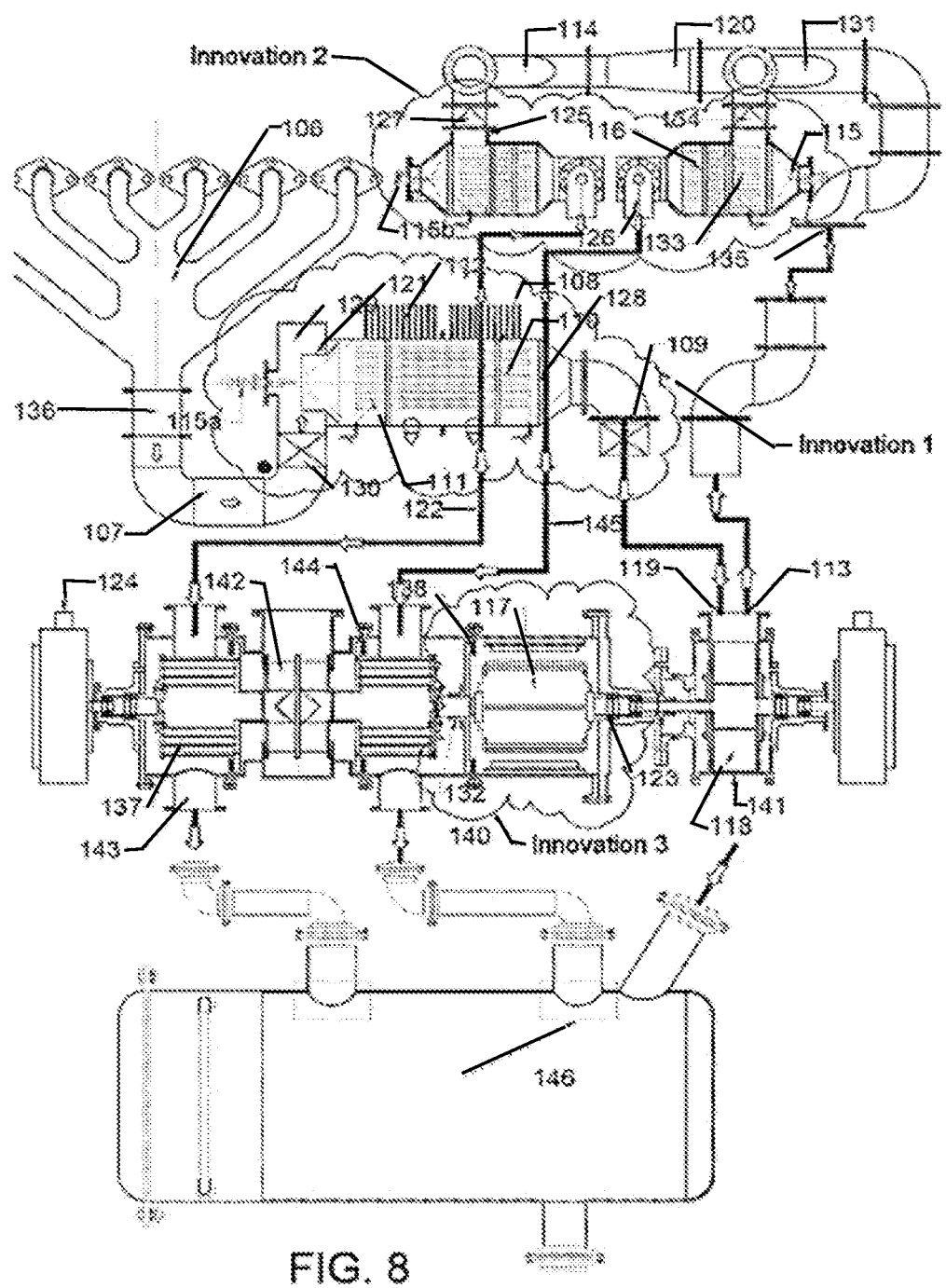
FIG. 8 represents a simple view of the dynamic flowchart in random order and a demonstration of the equipment and technological innovations including: innovation 1, innovation 2, innovation 3 (IN1, IN2, IN3). It also presents condensers diffusers and baffles after the force turbine coming from the fourth stage (called Force Generator Turbine or simply TGEF)
Figure 9:
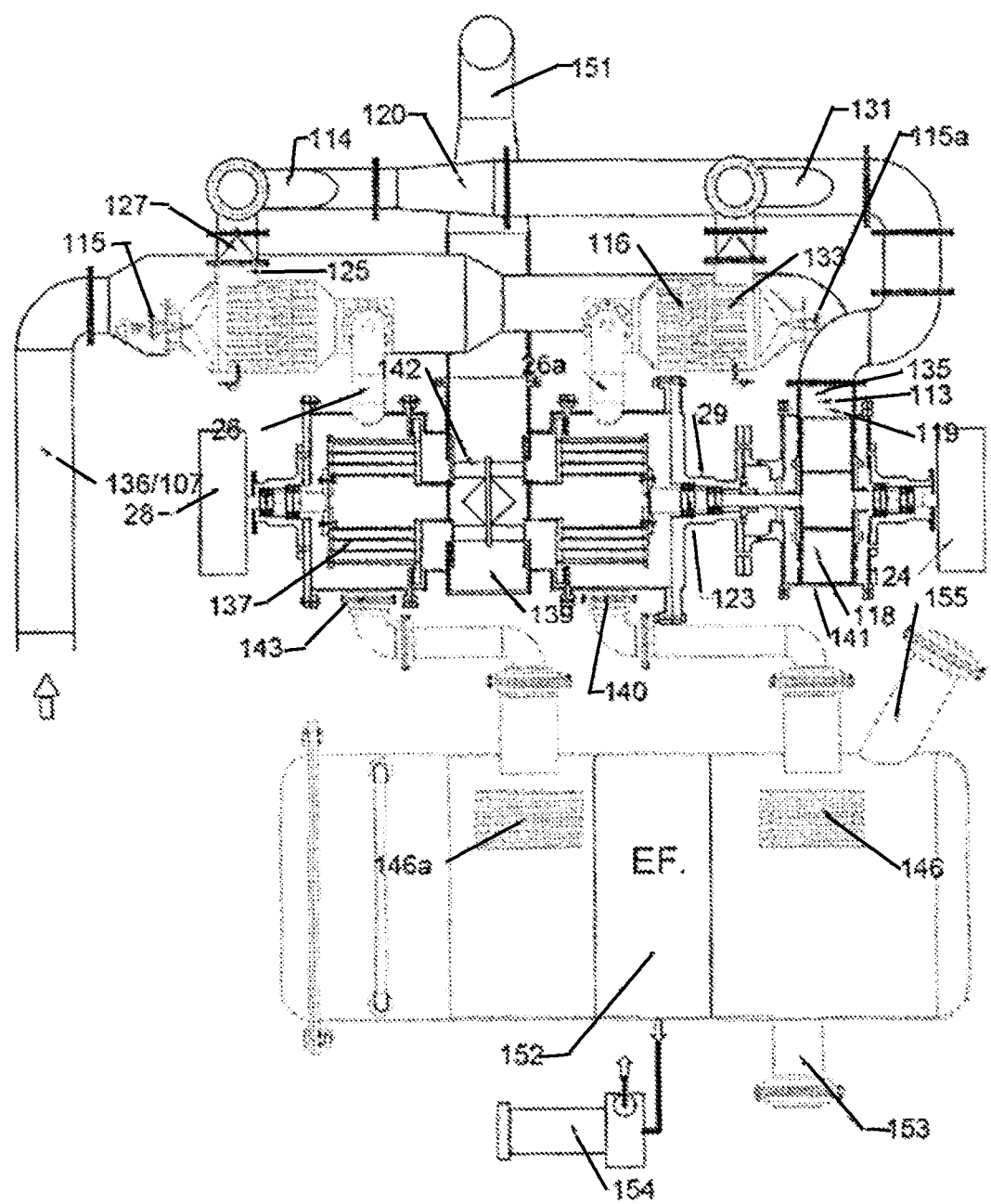
FIG. 9 represents a view in sectional elevation of the gas flow and particulate material coming from the combustion and passing through the TGEF.
Figure 10:
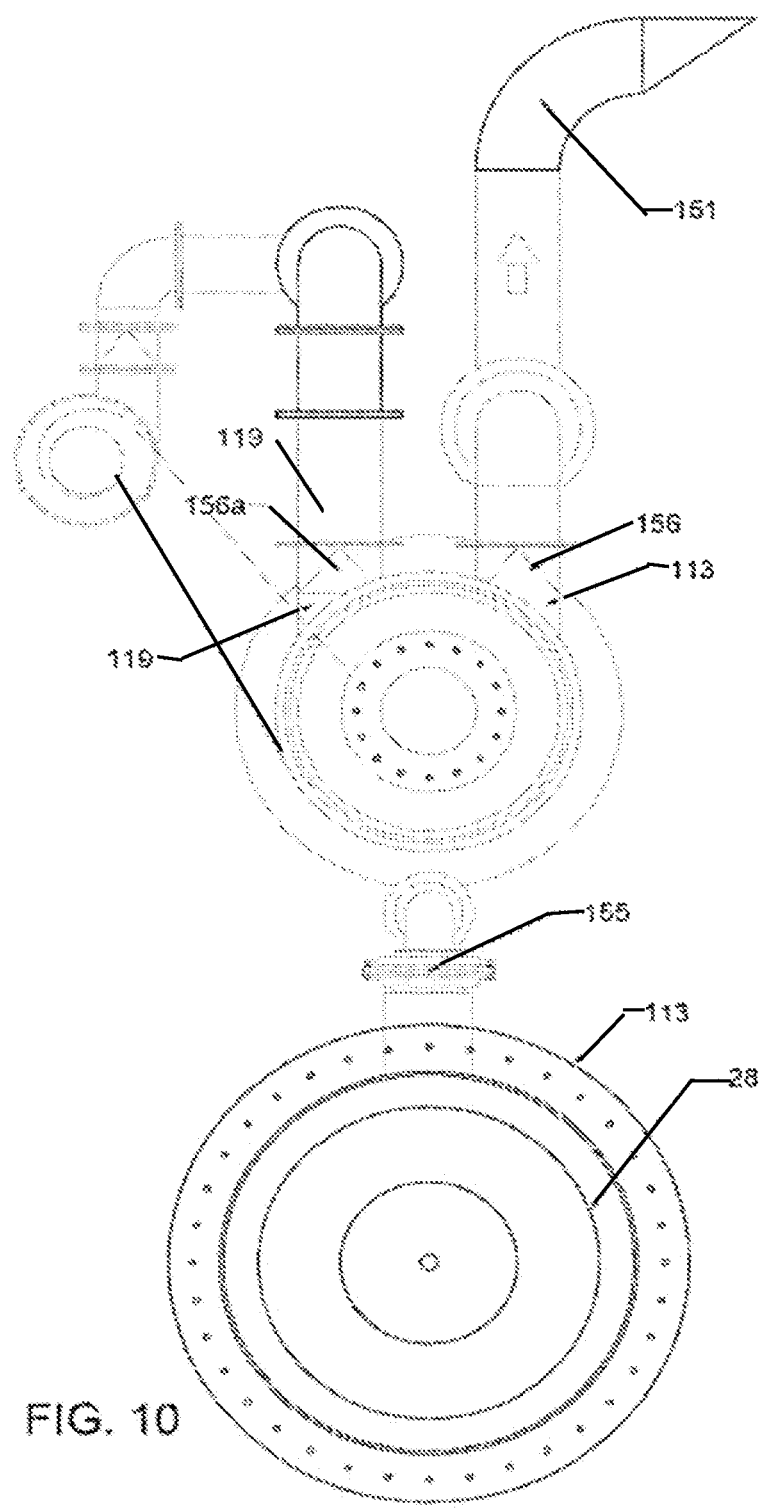
FIG. 10 represents a side elevation of the complete system.
Figure 11:
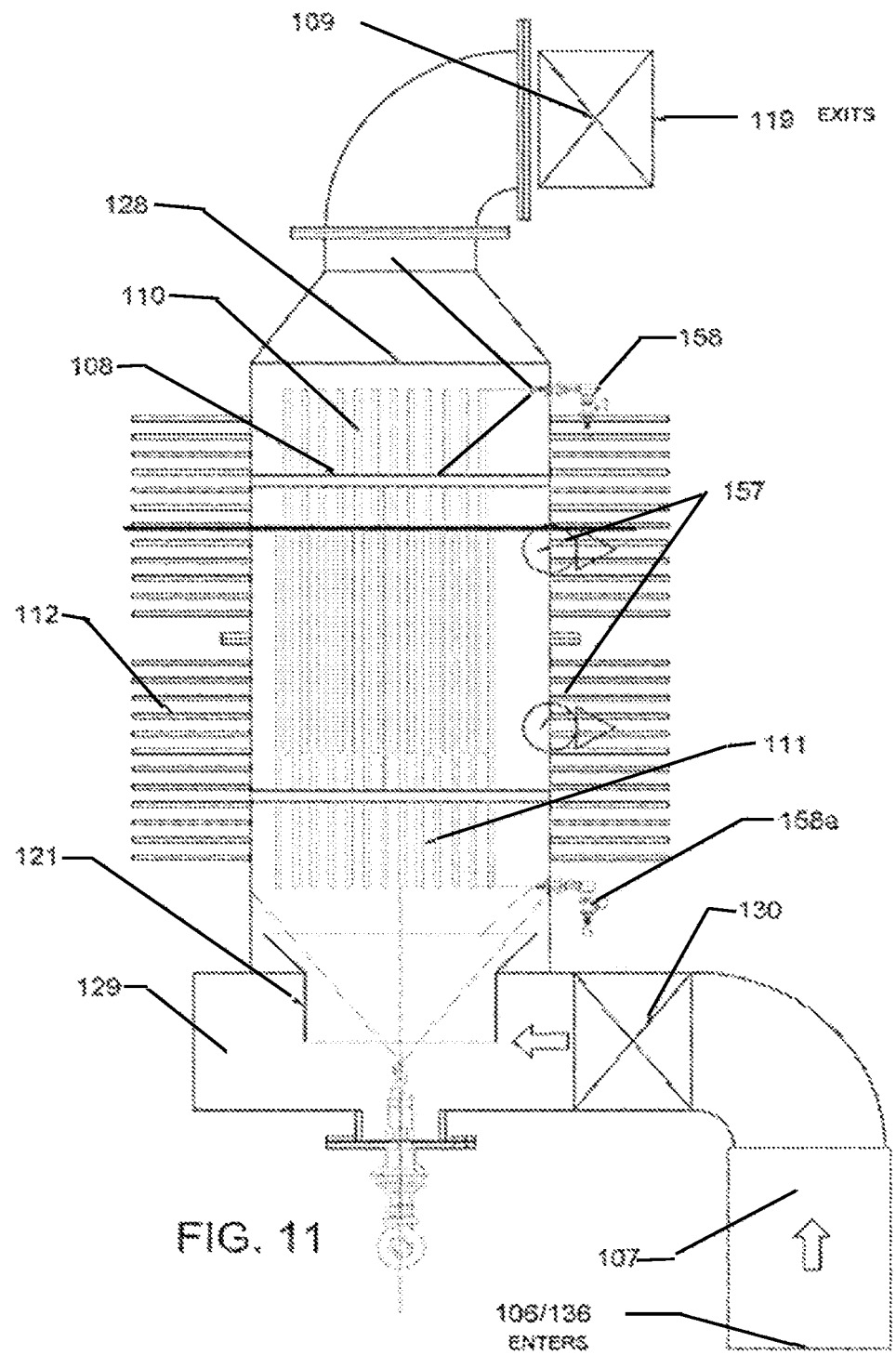
FIG. 11 represents a sectional view in elevation with details of operation, including atomizing nozzles, gas and particulates input in tangential geometry, heat sinks, diffuser pipes and baffles.
Figure 12:
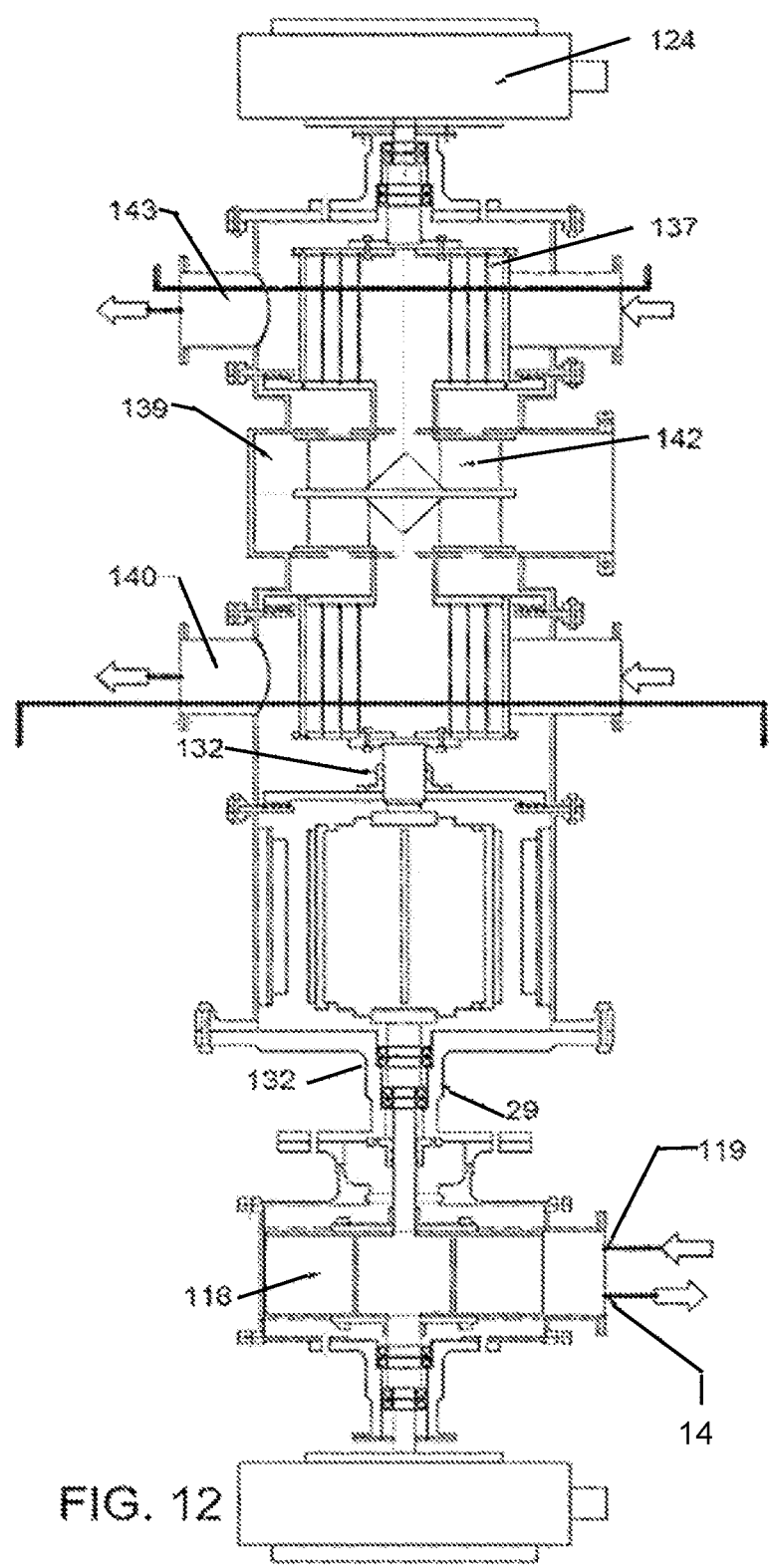
FIG. 12, IN1, represents a longitudinal view of part of technological innovations: disintegrating turbines, now working with central input or centrifuge with input and output of gases and tangential PM (particulate material) and new Inner Energy Generator (GIE), producing DC and AC.
Figure 13:
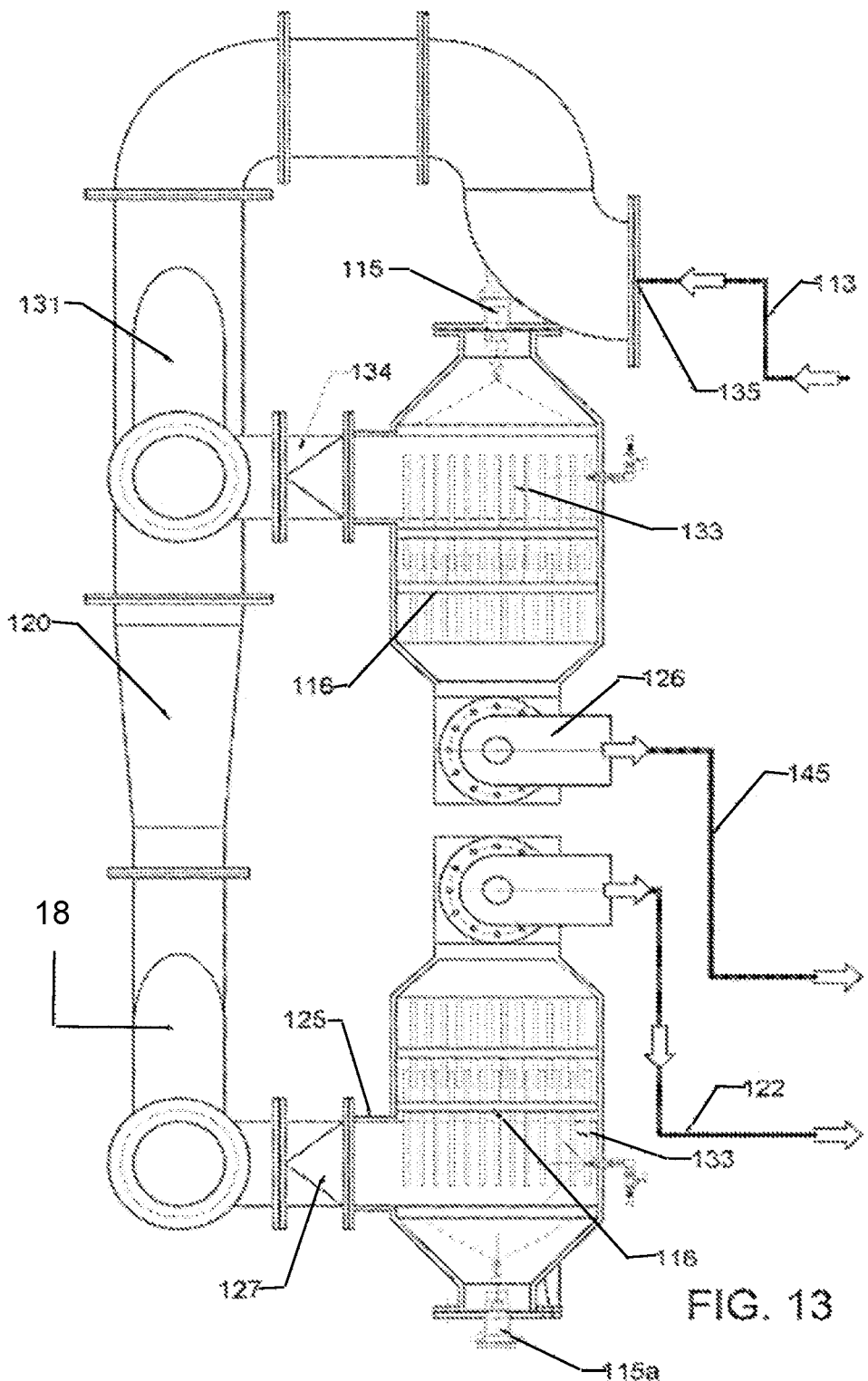
FIG. 13, IN2, represents a longitudinal view of the new process of treating gases, positioned after the TGEF. It comprises: pre-condensers, diffusers, baffles and purgers stabilizing and increasing the efficiency of the TGEF, curved inlet and tangential outlets. The IN2 works both vertically and horizontally (taking into account that there will be changes in purgers, atomizing nozzles and inputs, in case it works vertically).
Figure 14:
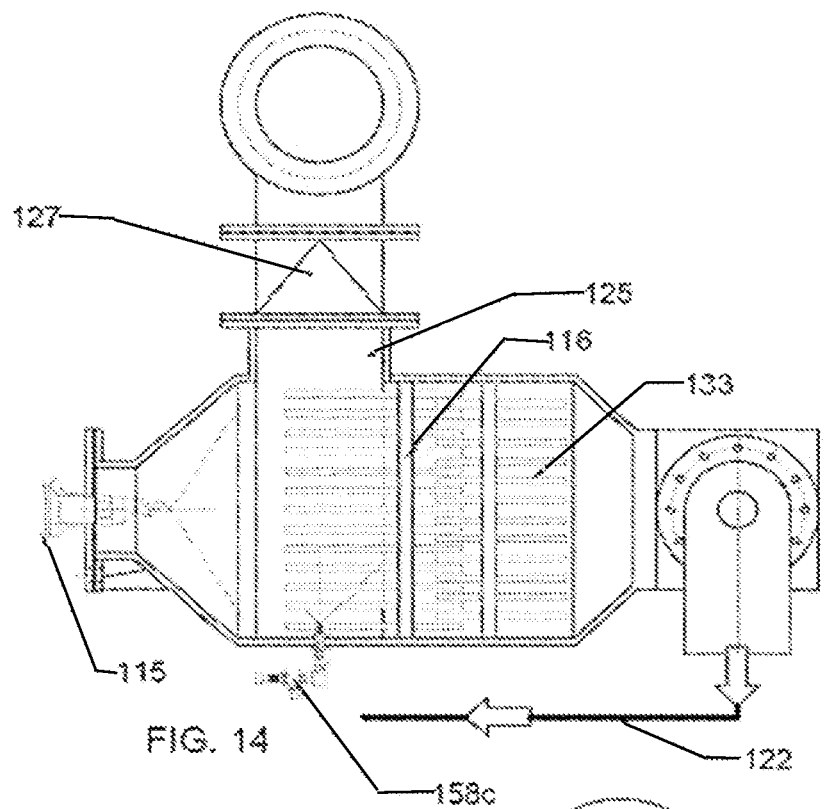
FIG. 14 represents a more detailed view of the condenser diffuser I, presented together with the diffuser and condenser II in FIG. 13.
Figure 15:
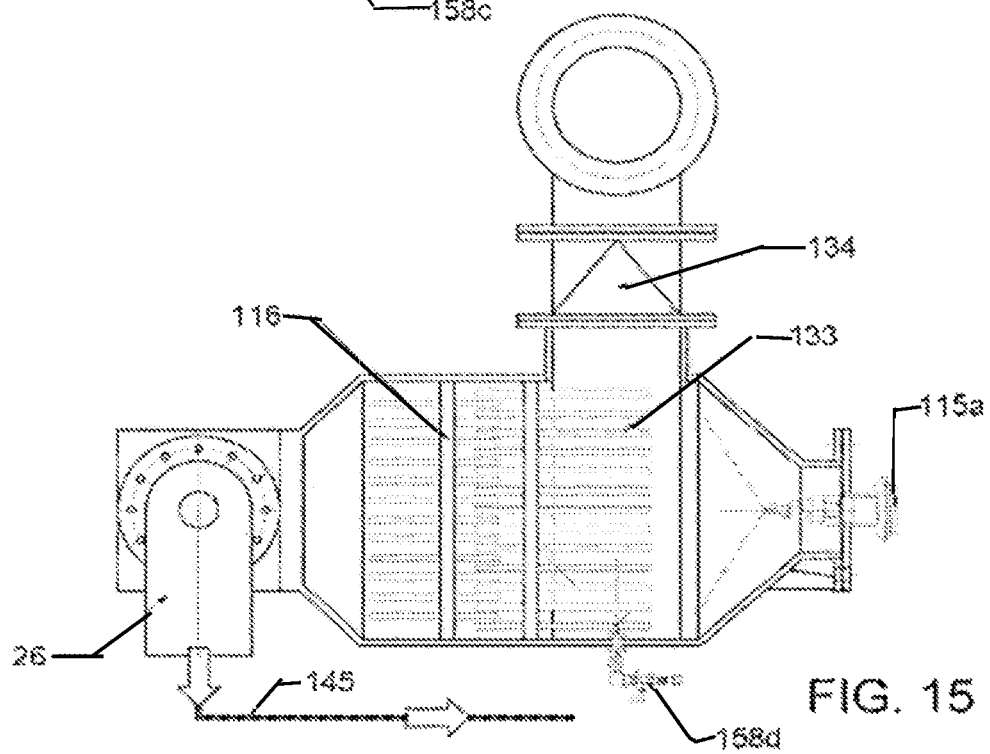
FIG. 15 represents a more detailed view of the condenser diffuser II, presented in together with the diffuser and condenser I in FIG. 13.
Figure 16:
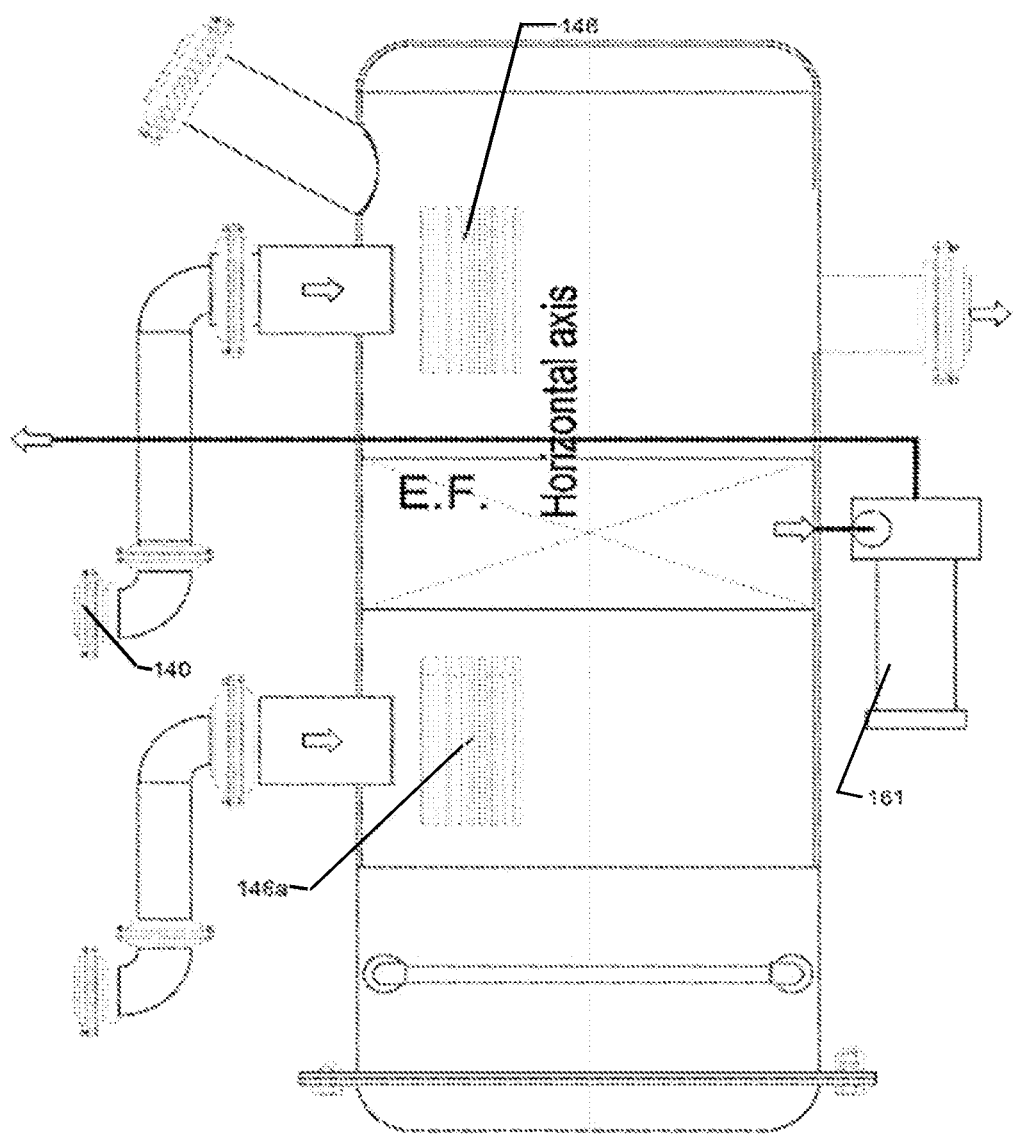
FIG. 16 represents in a longitudinal view a filtering system comprising: feeding pump of atomizing nozzles, screened baffle, level, inlet and outlet of waste supply and discharge.
Figure 17:
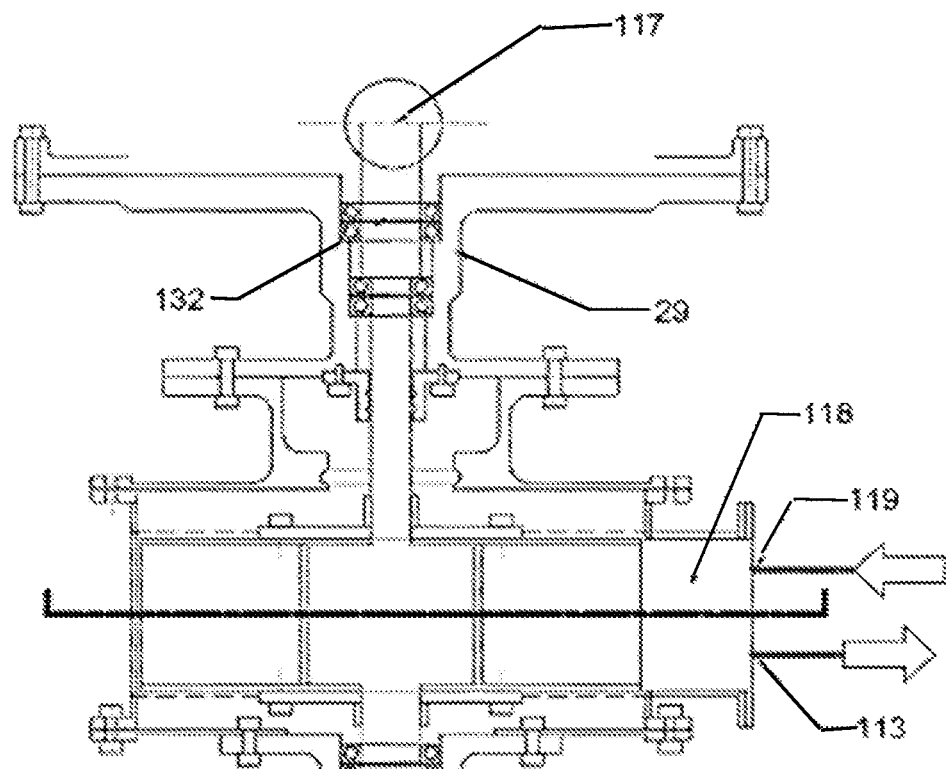
FIG. 17 represents in a longitudinal view the Force Generator Turbine: we can apply the TGEF near the distributor where we will have a better use of the heat resulting from combustion, a more indicated location to the "Y". It is also possible that the Y is also in the exhaust pipe end of the fourth stage, where temperatures at about 200° C. prevail.
Figure 18:
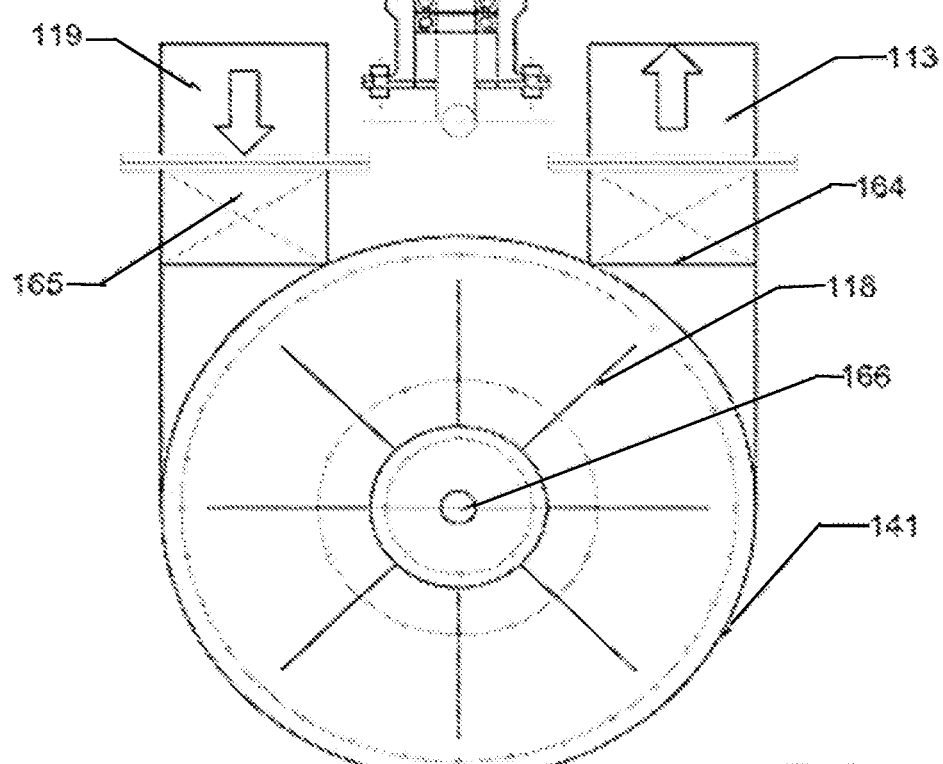
FIG. 18 represents a sectional side view of the items mentioned in FIG. 17.

Details of Innovation or Strategic Changes in the Layout:

As can be see in FIG. 8, the box coupled to the labyrinth formed internally with seals prevents the passage of water into the Inner Energy Generator (GIE) engine 132. The GIE is composed of a tangential entry of gaseous and particulate provided from the primary treatment phase of gases and particulate material 129. The pre-treatment 129 is performed by a properly designed device for the purpose of causing a compression and decompression, new expansion 121 and coupling measurements 107.

For pre-treatment, there are included a rectifier flow before the tangential inlet 130. In order to compress gases and particulates therein and throw them in the baffle disk 111, the diffuser pipes in the output of the more complete and efficient condenser, purger, diffuser, baffle (CPDD) 110, heat sinkers, the core cooling of condenser, diffuser and baffle 108, the condenser sink 112, the expansion chamber and conical output 128.

Many improvements and innovations were added, including: the inlet flow rectifier in force generating turbine 109, the inflow from the diffuser condenser to the generator turbine/rotor 119, the output of gases and particulate material to flow to the distributor, condenser I and II 113, the distributor, feeding the condenser I and II 135, piping, feeding the condenser I in its second stage 131, the conical pipe dimensioned to direct flow and curve for the condenser II 120, the curved flange, feeding the rectifier flow with tangential input I 114, the rectifier flow with a tangential entry into the condenser I, called tangential inlet I 127, the flow rectifier of the tangential inlet to the condenser II, called tangential inlet II 134

Also the model of the full cone atomizer nozzle has evolved for hydrating particles and cleaning gases 115. Such improvements include: the shape of the diffuser condenser II 133, the baffle disk of the condenser II 116, piping and curve with the flow toward disintegrating and cleaning turbine of Gases, particle collection and co-generation of energy (TDGE), input II 126, the snail with tangential input into the condenser I 125, the pipe interconnecting the condenser to the TDGE, input I 122, the pipe interconnecting the condenser II to the TDGE and the inlet II 145.

Other improvements developed in the system include the low, middle and high power generator, taking advantage of rotor torque, internal co-generation antimagnetic type energy, using neodymium or conventional 117, the magnetic generator in series, according to the power the motor and the rotor 124. Other developments including the use of conventional or magnetic bearings of high quality to avoid friction. Also we work at the maximum within the inertia 123, shell/closing box of the rotor lock/force generator turbine 141, the rotor blades in the force generating turbine 118, the intermediate rotor between the turbines in order to expel dried and purified gases, free of particles into the atmosphere 142, the shell of the intermediate rotor of the turbine, closing of 142, the pipe I with the purpose of draining waste water with disintegrating turbine to the water tank 143, pipe II in order to drain waste water with disintegrating turbine to the water tank 140.

Also the flanged labyrinth prevents the contact of gases and particles between the two disintegrating turbines 144 (left side), the flanged labyrinth preventing the contact of gas and particles between the two disintegrating turbine 138 (right side), the flange and acrylic retaining/sealing box 132, the disintegrating turbine 137, comprising: cylinders, tracks, contact cell, rods separating gas and waste water, in order to pass gas to the core of the turbine and waste water to the water tank.

Additionally, there have also been developed the fourth manifold temperature stage at approximately 800° C., which can vary for more or less, the flow direction of condenser/diffuser/baffle 106, the flow rectifier 136, the screened baffle with direct flow of waste water and return of cleaned gas into the atmosphere 146 and 146a. Each mentioned-above item is an important detail to increase the intensity of power generation and the treatment efficiency of each gaseous pollutant and microparticulates.

The invention claimed is:

1. A fluid cleaning and filtering device, comprising:
    a torque generating turbine housed into a U-shaped shell, wherein the turbine has an input fluidly connected to a flow rectifier, and an output fluidly connected to a dispenser;
    an inner generator within the turbine housing connected to the turbine, such that said turbine provides mechanical energy to said generator;
    labyrinths connected to flanged retainer boxes that are arranged in each generator end, configured to prevent the gas and particle flow to within the generator;
    at least one disintegrating turbine;
        wherein at least one disintegrating turbine each has an input and an output;
    a rotor connected to at least one disintegrating turbine; and
    at least one outer generator outside the turbine housing.

2. A method of cleaning and filtering fluid, comprising the steps of:
    performing a first cleaning and filtering of the fluid;
    injecting the fluid into a turbine for a second cleaning, wherein a movement of the turbine drives an inner generator within the turbine housing and an outer generator outside the turbine housing;
    dispensing the fluid from a dispenser;
    performing a third cleaning;
    injecting the fluid in at least one disintegrating turbine for an additional cleaning; and flowing fluid to a collection reservoir.

3. A fluid cleaning and filtering device for cleaning and filtering fluid according to a method of claim 2, comprising:
    a diffuser-baffle-condenser-purger (DDCP), including
        a pre-condenser with an expansion chamber promoting the compression and posterior expansion having at least one atomizer nozzle arranged in an end thereof wherein a flow rectifier is in contact with the pre-condenser;
    a cylindrical device with baffle disks in an inner part thereof and diffuser pipes in an outer part thereof,
        wherein said cylindrical device has at least one atomizer nozzle arranged along a 1 length thereof, and
        wherein radial pipes pierce the baffles and the diffusers; and
    a fluid compressing conical output arranged at an end of the cylindrical device;
        wherein the conical output is connected to a pressure concentrating flow rectifier.

* * * * *